United States Patent
Moudy et al.

(10) Patent No.: US 9,336,268 B1
(45) Date of Patent: May 10, 2016

(54) RELATIVISTIC SENTIMENT ANALYZER

(71) Applicant: Pearson Education, Inc., Upper Saddle River, NJ (US)

(72) Inventors: Christopher Moudy, Chandler, AZ (US); Todd Paterson, Phoenix, AZ (US); Kevin Berns, North Liberty, IA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/681,474

(22) Filed: Apr. 8, 2015

(51) Int. Cl.
*G06F 17/30* (2006.01)
*G06F 17/27* (2006.01)
*G06N 3/04* (2006.01)

(52) U.S. Cl.
CPC .......... *G06F 17/30412* (2013.01); *G06F 17/27* (2013.01); *G06F 17/3053* (2013.01); *G06N 3/0445* (2013.01)

(58) Field of Classification Search
None
See application file for complete search history.

(56) References Cited

U.S. PATENT DOCUMENTS

| | | | |
|---|---|---|---|
| 8,554,701 B1 * | 10/2013 | Dillard et al. | 706/12 |
| 9,092,829 B2 * | 7/2015 | Fleischman et al. | |
| 2014/0091897 A1 * | 4/2014 | Lemmey et al. | 340/3.1 |

OTHER PUBLICATIONS

Huck, S. "Stanine Scores". Reading Statistics and Research 6th Edition. 2012. <retrieved from http://www.readingstats.com/Sixth/email2d.htm>. <retrieved on Aug. 4, 2015>.*

* cited by examiner

*Primary Examiner* — Kakali Chaki
*Assistant Examiner* — Eric Nilsson
(74) *Attorney, Agent, or Firm* — Kilpatrick Townsend & Stockton LLP

(57) ABSTRACT

Sentiment analyzer systems may include feedback analytics servers configured to receive and analyze feedback data from various client devices. Feedback data may be received and analyzed to determine feedback context and sentiment scores. In some embodiments, natural language processing neural networks may be used to determine sentiment scores for the feedback data. Feedback data also may be grouped into feedback aggregations based on context, and sentiment scores may be calculated for each feedback aggregation. Sentiment analyzer outputs and corresponding output devices may be determined based on the sentiment scores and feedback contexts.

20 Claims, 24 Drawing Sheets

PARTICIPANT A - SENTIMENT FACTOR REPORT

| eLearning Content or Factor | Sentiment Score +/- |
|---|---|
| Reading Content A | + 0.32 |
| Reading Content B | + 0.46 |
| Reading Content C | - 0.11 |
| Writing Assignment A | + 0.56 |
| Writing Assignment B | + 0.51 |
| Individual Presentation A | - 0.49 |
| Individual Presentation B | - 0.62 |
| Group Presentation A | + 0.18 |
| Presenter A | + 0.37 |
| Presenter B | - 0.06 |
| User Device A | + 0.24 |
| User Device B | + 0.35 |
| User Device C | - 0.28 |
| Evaluation A | + 0.10 |
| Evaluation B | - 0.34 |
| ... | ... |

PARTICIPANT GROUP - SENTIMENT FACTOR REPORT

| eLearning Content or Factor | Sentiment Score +/- |
|---|---|
| Reading Content A | + 0.23 |
| Reading Content B | - 0.15 |
| Reading Content C | - 0.61 |
| Presenter A | + 0.26 |
| Presenter B | + 0.12 |
| Presenter C | + 0.59 |
| Presentation Type - Group | - 0.22 |
| Presentation Type - Individual | - 0.45 |
| Content/Media Type A | + 0.24 |
| Content/Media Type B | - 0.12 |
| User Device Type A | - 0.33 |
| User Device Type B | + 0.22 |
| User Device Type C | - 0.04 |
| Evaluation Type A | + 0.15 |
| Evaluation Type B | - 0.07 |
| ... | ... |

RELATIVISTIC SENTIMENT ANALYZER

BACKGROUND

Sentiment analyses may use natural language processing and other textual analysis techniques to determine objective or subjective sentiment within input data. For example, keyword or phrase scoring systems may assign a range of numeric values to input text data corresponding to positive, negative, or neutral sentiment. Applications of text mining and sentiment analysis systems can be applied in various fields including market research, customer experience management, and social media monitoring applications.

BRIEF SUMMARY

Various embodiments described herein may relate to systems and methods for capturing feedback data in a content distribution network and performing sentiment analyses. In some embodiments, sentiment analyzer systems may include feedback analytics servers configured to receive and analyze feedback data from various client devices. The feedback data may be received and analyzed to determine feedback context and a sentiment score for each feedback data. In some cases, natural language processing neural networks may be used to determine sentiment scores for feedback data. Feedback data also may be grouped into feedback aggregations based on context, and sentiment scores may be calculated for each feedback aggregation. Sentiment analyzer outputs and corresponding output devices may be determined based on the sentiment scores and feedback contexts.

In some embodiments, the captured feedback data may include uni-modal and/or multimodal input data. In such systems, additional feedback capture devices and multimodal data analysis devices may be included in the sentiment analyzer. For example, audio, image, and video data capture devices and data analyzers may be incorporated to analyze multimodal feedback data, synchronize the feedback data, and calculate and sentiment scores.

Additionally, the feedback data may be grouped into multiple feedback aggregations corresponding to the same feedback context but different time periods. In such cases, the feedback aggregations may be analyzed to determine trends and patters in feedback sentiment, and/or identify outlier data for specific system users, groups, or content.

In certain embodiments, a sentiment analyzer system may determine sentiment scores in real-time or near real-time and transmit sentiment analyzer outputs to one or more presentation computing devices associated with a presenter of live content.

As noted above, in some embodiments, various natural language processing (NLP) engines, such as sentiment neural networks, may be used to calculate sentiment and analyze individual and group sentiment based on received feedback data. Such sentiment neural networks may be trained using content feedback data as input and corresponding sentiment-related results data as output, in order to construct a neural network data structure capable of determining associations between user feedback data and user sentiment with a high degree of accuracy. Additionally, context-specific sentiment neural networks may be constructed and trained based on the particular computing architecture and/or functional purpose of one or more content distribution networks.

Certain sentiment analyzer systems and/or content distribution networks described herein also may be implemented as sentiment interference systems in which multiple sentiment measurements may be analyzed to determine interferences, such as notifications and/or interventions, based on the various user sentiment data. Additionally, in some embodiments, sentiment analyzer systems and/or content distribution networks may be configured to analyze and report sentiment associated with specific content and other system factors.

BRIEF DESCRIPTION OF THE DRAWINGS

FIGS. 24A and 24B are example charts illustrating sentiment factor reports, according to one or more embodiments of the disclosure.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
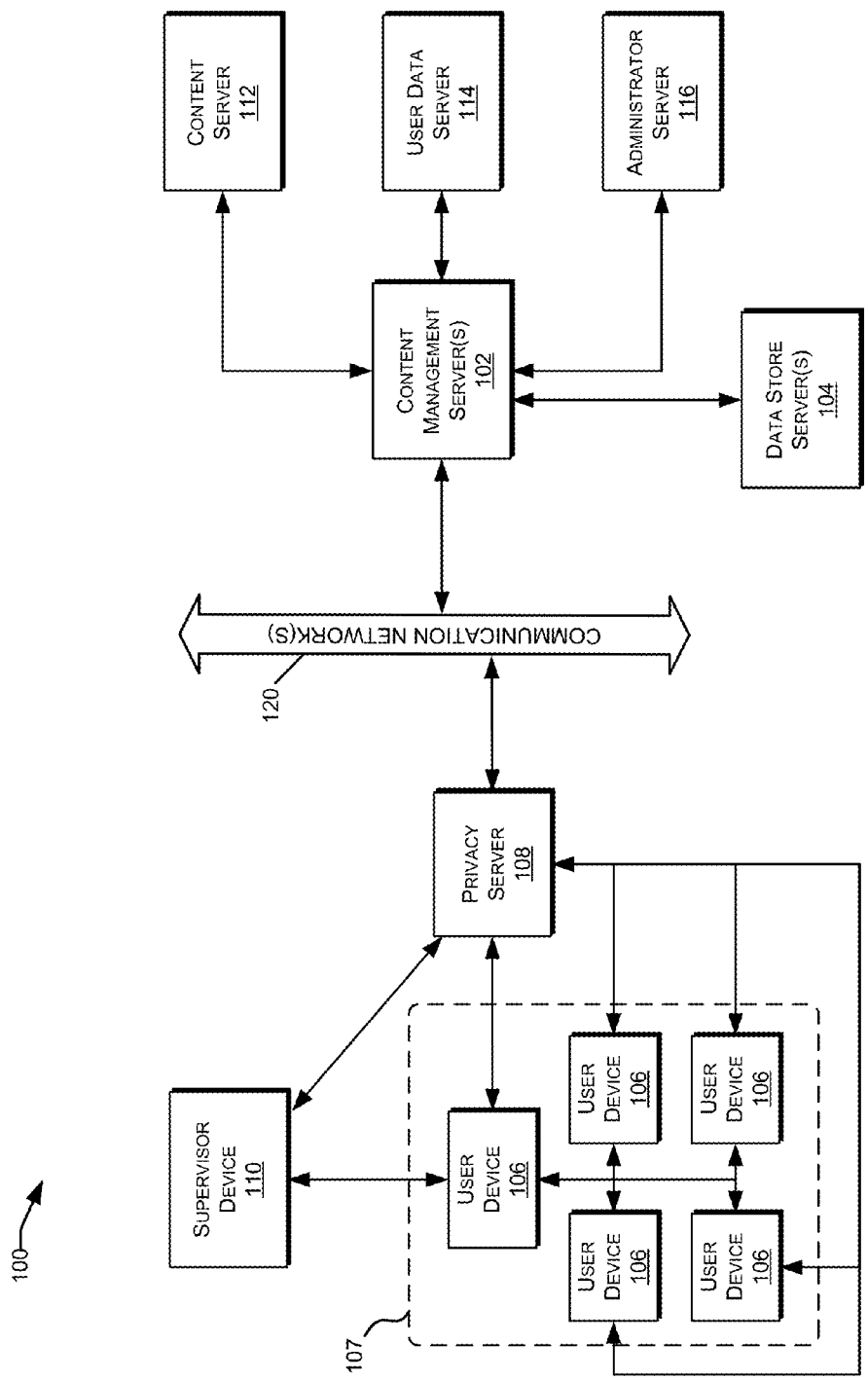
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
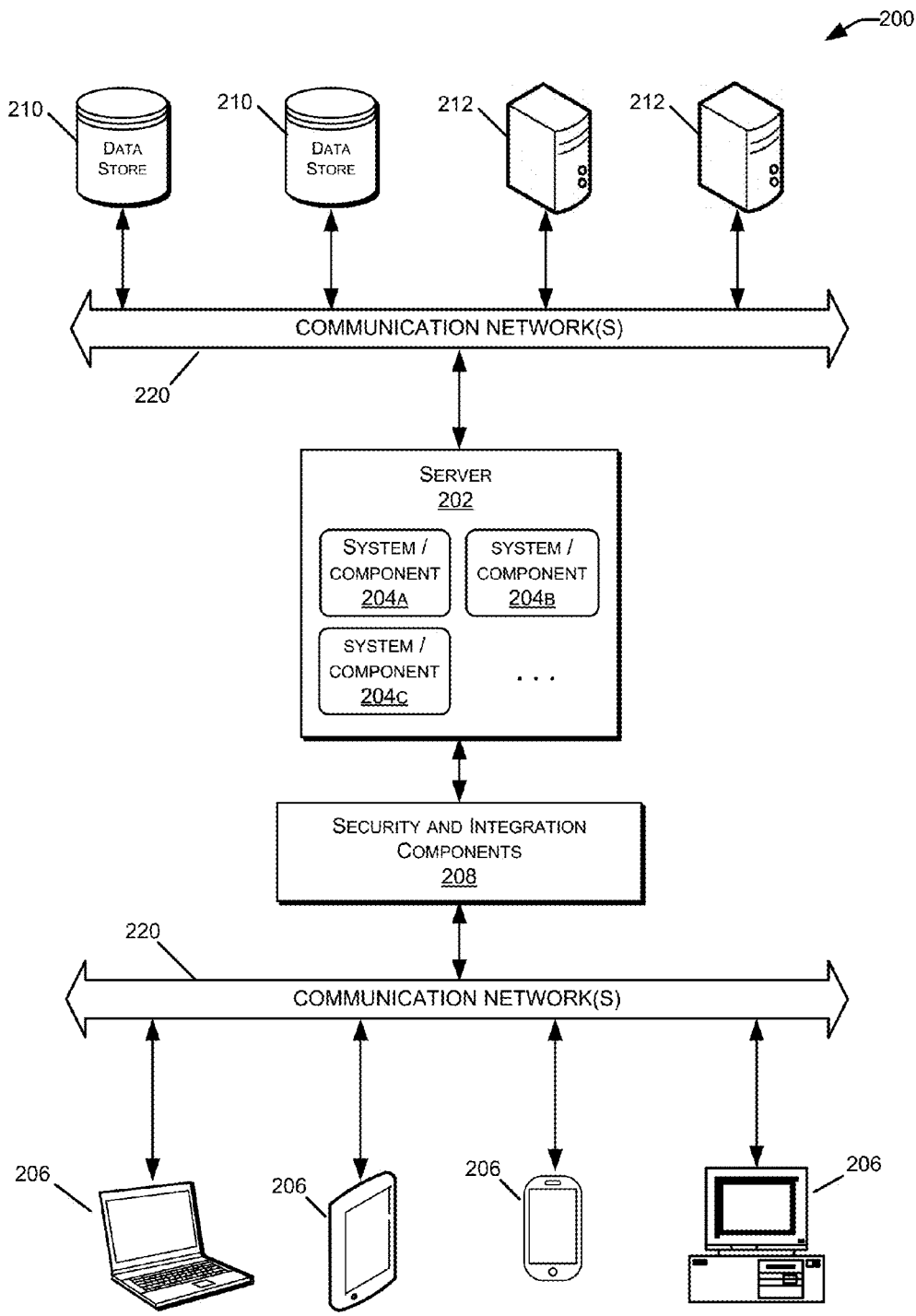
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
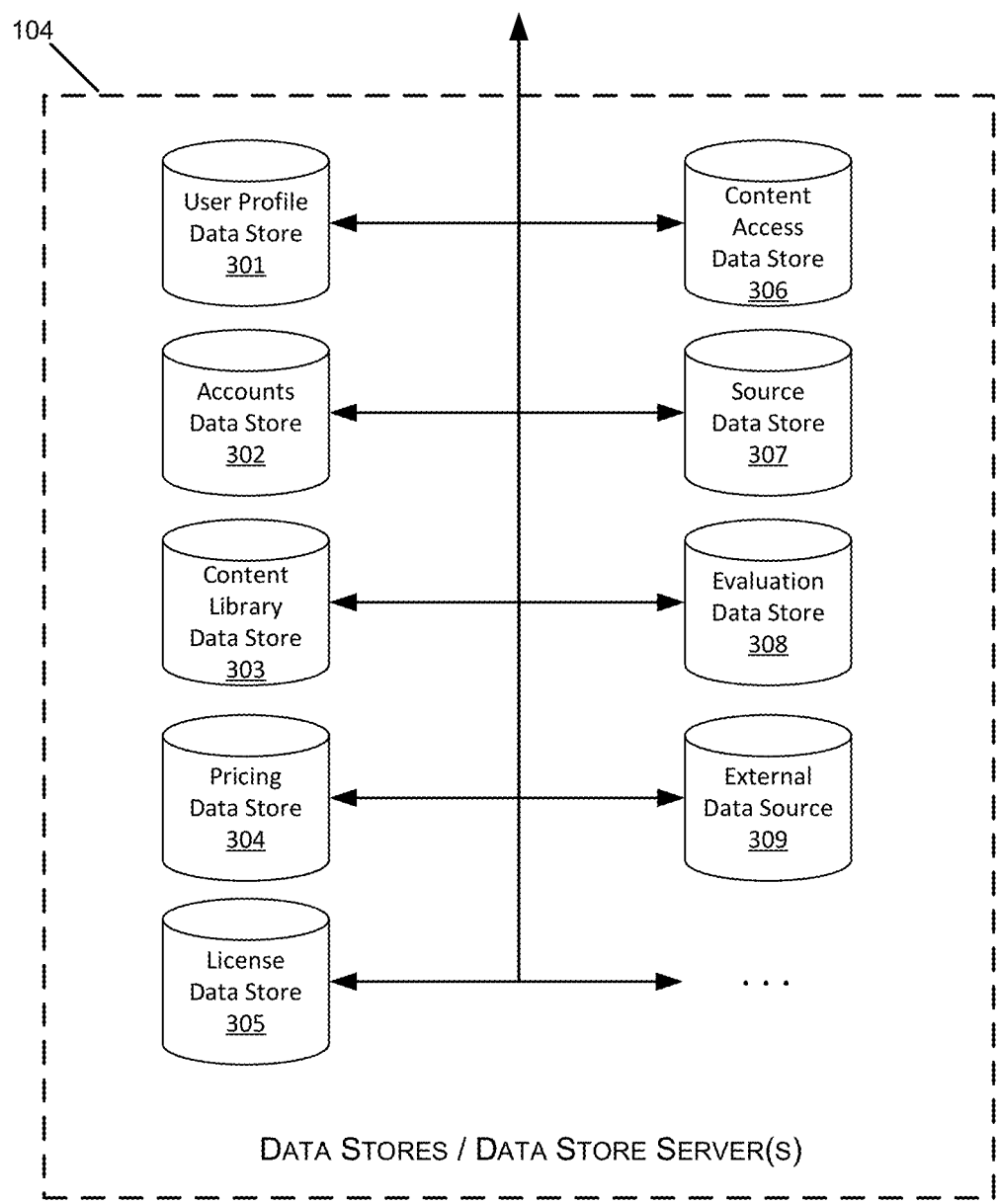
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
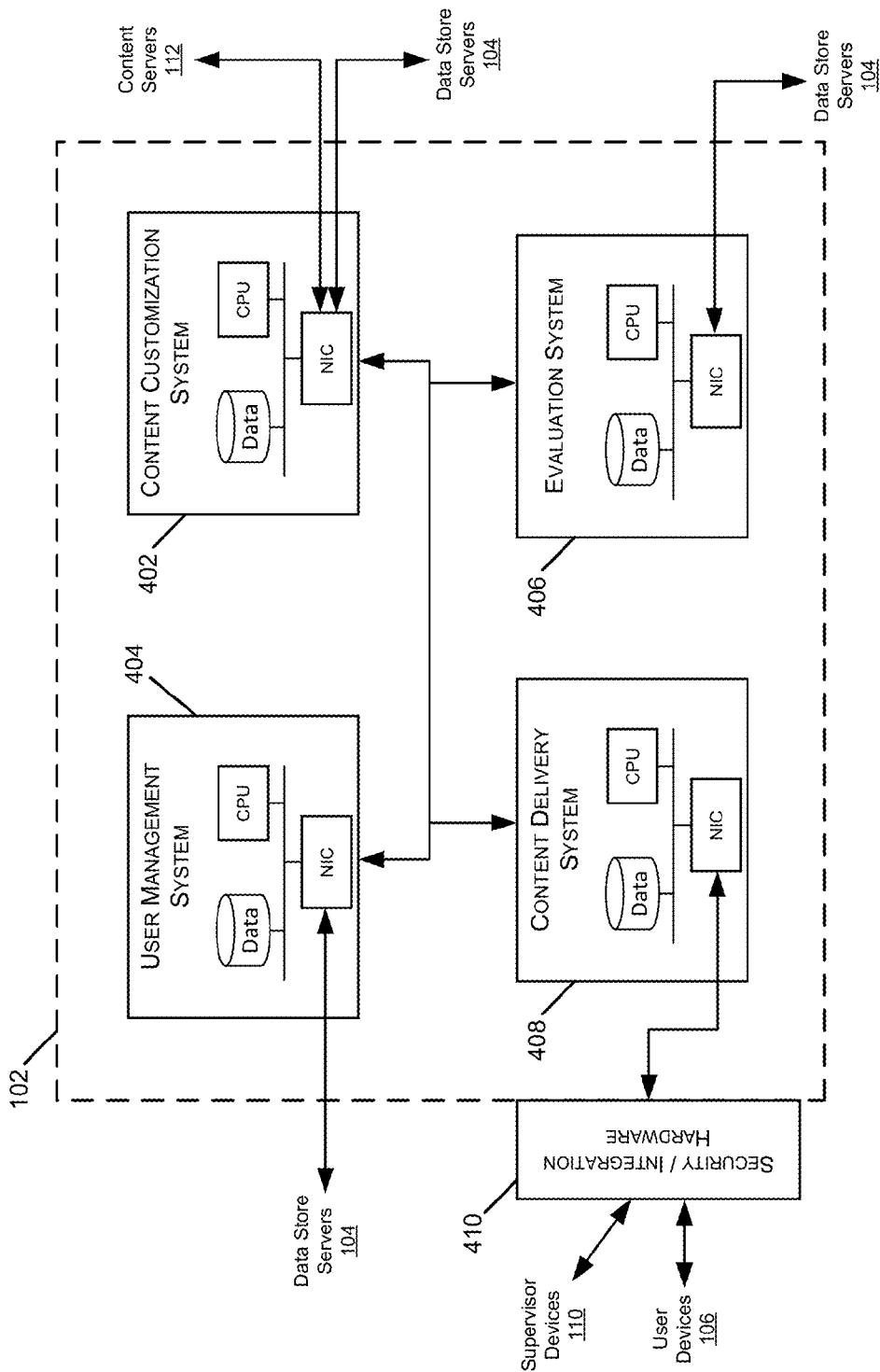
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
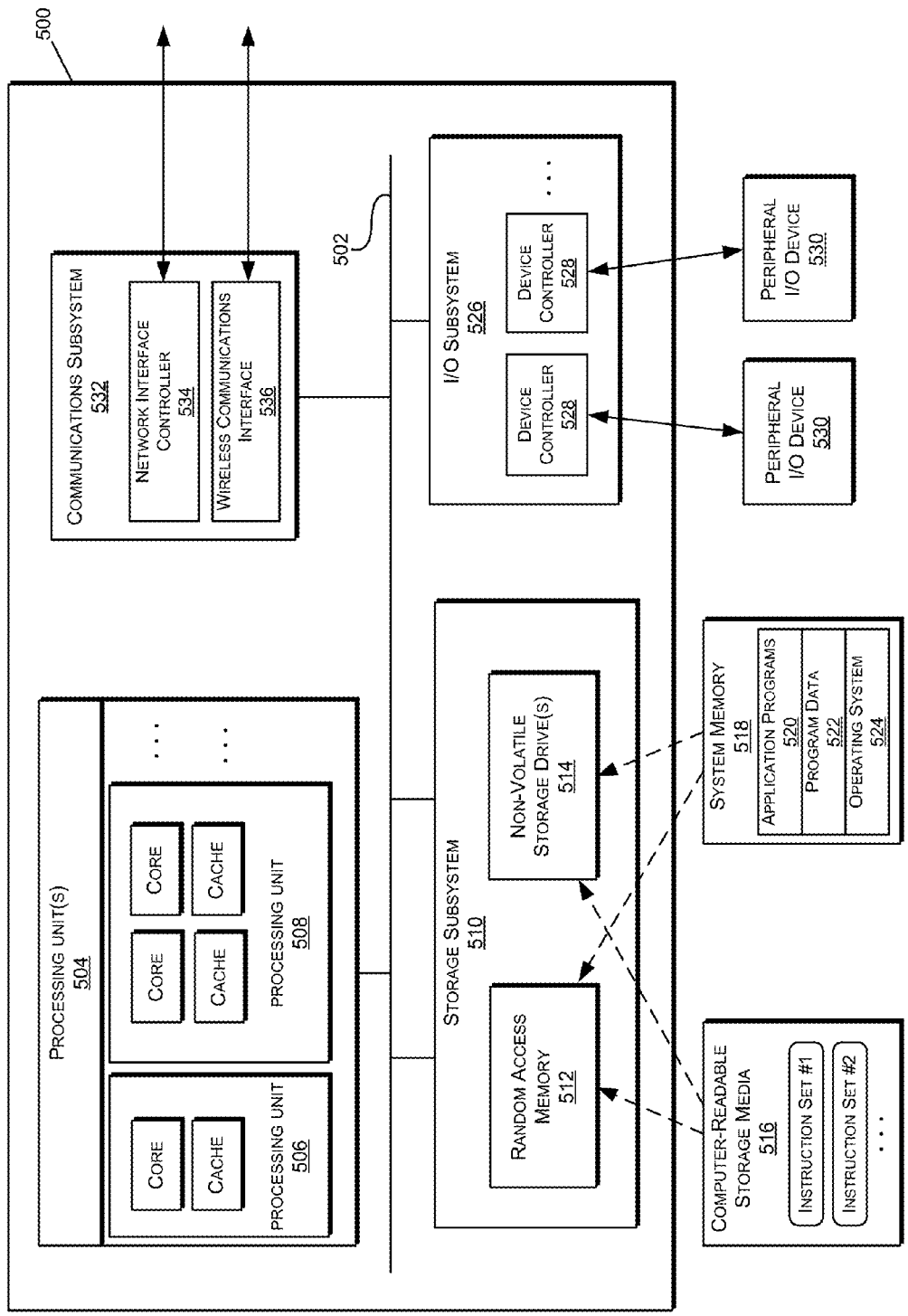
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USBC® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
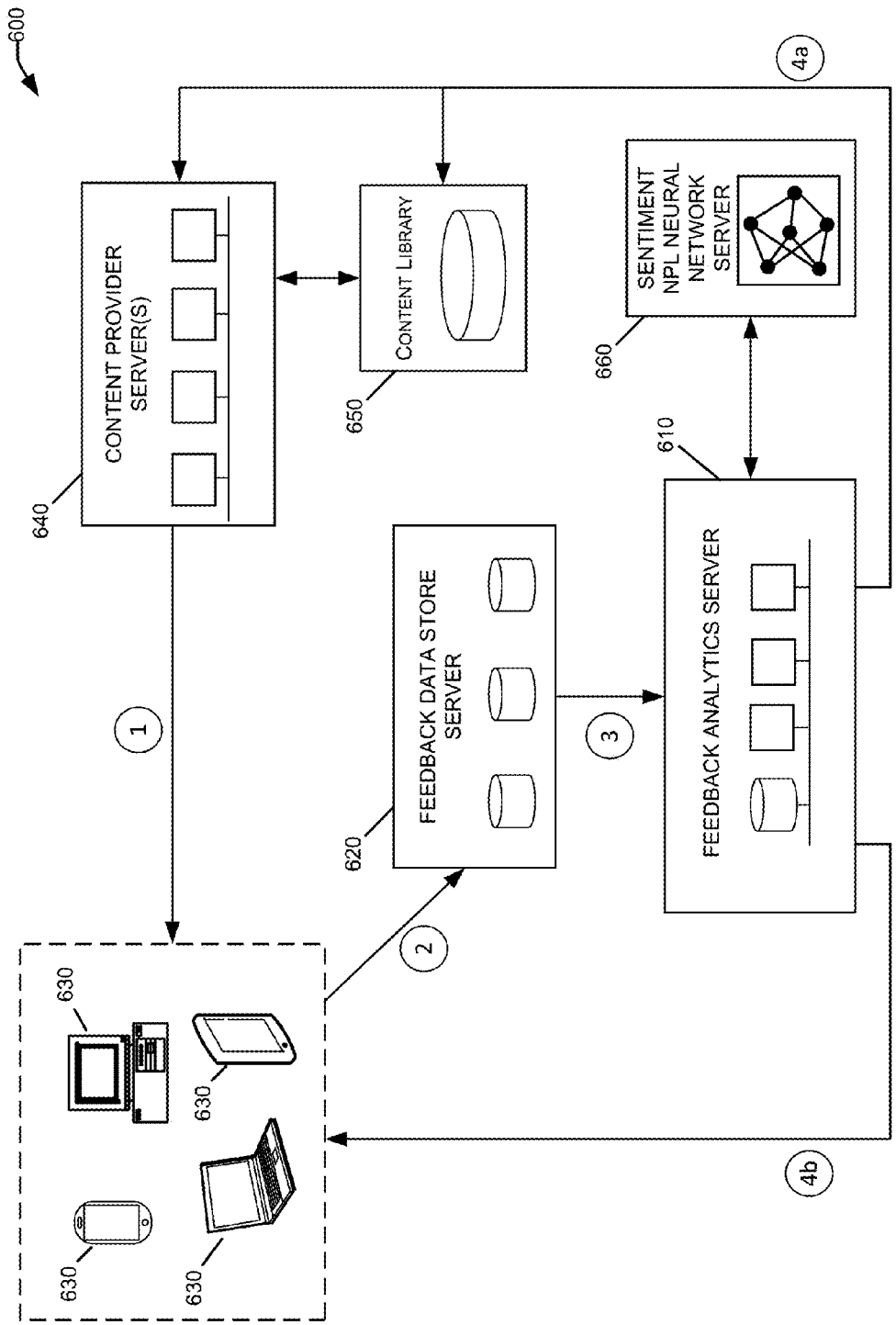
FIG. 6 is a block diagram illustrating an example system for receiving and analyzing user feedback data and calculating sentiment for various feedback aggregations and contexts, according to one or more embodiments of the disclosure.

With reference now to FIG. 6, a block diagram is shown illustrating an example sentiment analyzer system for receiving and analyzing user feedback data and calculating sentiment for various feedback aggregations and contexts. The system 600 illustrated in this example may be integrated within (or configured to operate in collaboration with) a content distribution network 100, and may be configured to analyze user feedback from the content distributed over the network 100 and provide feedback sentiment output to various content providers or content consumers within the network 100. Specific examples of content distribution networks 100 and/or sentiment analyzer systems 600 may include, without limitation, educational and professional training systems and networks, interactive gaming systems and networks, media distribution systems and networks, and enterprise application systems and networks, and/or social networking/dating systems and networks. As discussed below, each of the components shown in the example sentiment analyzer system 600 in FIG. 6 may correspond to a single computer server or a complex computing system including a combination of computing devices, storage devices, network components, etc. Further, each of these components and their respective subcomponents may be implemented in hardware, software, or a combination thereof.

In certain embodiments described herein, a sentiment analyzer system 600 may include various components configured to collect, store and analyze feedback data relating to content items provided by a content provider 640 via a CDN 100 (Arrow 1). Feedback may be collected by and transmitted from various client devices 630 to one or more data store servers 620 (Arrow 2), which may provide the data to a feedback analytics server 610 (Arrow 3). The feedback analytics server 610 may determine feedback and calculate one or more sentiment scores, which may then be provided to back to content provider servers 640, client devices 630, and/or data store servers 620 (Arrows 4a-4b).

As discussed below, the types and characteristics of the content transmitted, the feedback data provided, the sentiment analyses performed, and the outputs of sentiment analyzer system, may depend on the functional purpose and computing architecture of the sentiment analyzer system 600 and/or related CDNs 100. For example, for CDNs 100 used for professional training and educational purposes (e.g., eLearning, web-based training, or other computer-based instructional systems), a sentiment analyzer system 600 may be designed and implemented to collect and analyze feedback from users (e.g., students, employees, trainees, etc.) relating to course modules, training materials, assignments, presentations, lectures, projects, and the like. The content feedback in such systems 600 may be collected in the form of online discussion posts, user emails, course or instructor evaluations, participation metrics, etc., and may be used to calculate sentiment of individual users and groups relating to specific learning materials, courses, programs, and/or presenters. In other examples, for CDNs 100 used for online product sales, product reviews, and/or media content distribution (e.g., cable, satellite, or computer-based on-demand request and subscription services for music, movies, televisions, and the like), a sentiment analyzer system 600 may be designed and implemented to collect and analyze feedback from users in the form of product reviews, media content reviews, and related user feedback. Such systems 600 may collect and analyze the content feedback in order to perform sentiment determinations and calculations relating to the products and services offered via the CDN 100. In further examples, for CDNs 100 corresponding to social network, interactive gaming, and/or dating websites and applications, a sentiment analyzer system 600 may be designed and implemented to collect and analyze online discussion posts and responses, messages between users, course or instructor evaluations, and other user actions, and to perform sentiment determinations and calculations for individual users and groups, user profiles, and content shared via the social networking or dating CDN 100.

The example sentiment analyzer system 600 includes a feedback analytics server 610. As discussed in more detail below, feedback analytics server 610 may include various components and subsystems to receive and analyze content feedback data collected within one or more content distribution networks 100, and to calculate sentiment for individual feedback data and aggregations of feedback data. For example, the feedback analytics server 610 may receive content feedback data from a feedback data store servers 620 and/or directly from client devices 630. The feedback analytics server 610 may determine sentiment scores and/or feedback contexts for each individual feedback data, and may then group and calculate sentiment scores for various aggregations of feedback data. In various embodiments, the feedback analytics server 610 may also determine trends and patters in feedback sentiment, and may identify outlier data and/or specific users, groups, or content that meet criteria. In some cases, the feedback analytics server 610 may use one or more natural language processing (NLP) engines, such as a sentiment NLP neural network 660, in order to perform sentiment calculations and analyze individual and group sentiment based on the received feedback data. After calculating one or more sentiment scores corresponding to users and/or content within the CDN 100, the feedback analytics server 610 may output the sentiment scores to one or more feedback data stores 620, user devices 630 and/or content provider servers 640.

In order to execute the functions and tasks described herein, the feedback analytics server 610 may include a single computer server or combination of computer servers, storage devices, network components, etc. Feedback analytics server 610 may be implemented using any combination of the computer hardware, software, storage, and network components discussed above, such as those in illustrative computer system 500, and also may be implemented within any of the computing environments discussed above, such as content distribution network 100 and/or distributed computing environment 200. For example, feedback analytics server 610 may include secure storage device(s) to store content feedback and/or neural networks 660, processors and software execution engines for analyzing and grouping content feedback and calculating sentiment scores, and network interface components for transmitting sentiment analyzer output to one or more output devices 620-640.

The sentiment analyzer system 600 also may include one or more content provider servers 640 and/or client devices 630. In some embodiments, the content provider servers 640 in FIG. 6 may correspond to the content management servers 102 in FIG. 1 and/or FIG. 4, and the client devices 630 may correspond to the user devices 106 and 110 in FIG. 1, and 206 in FIG. 2. Thus, the client devices 630 and content provider servers 640 shown in FIG. 6 and may include some or all of the same hardware, software, storage and network components described above in reference to FIGS. 1-5. As discussed above, content providers 640 may manage and execute processes within various CDNs 100, such as educational and professional training CDNs, interactive gaming CDNs, enterprise CDNs, social networking/dating CDNs, and the like. Content provider servers 640 may store and manage content items within one or more content library data stores 650, as well as providing access to the content items by client devices 630.

As shown in FIG. 6, sentiment analyzer system 600 may also include one or more data store servers 620. Data stores 620 may receive, store, and aggregate repositories of content feedback from client devices 630. Separate and isolated storage devices, logical databases, and/or filed-based logical storage structures may be used for storing the feedback data associated with different users and/or different content items. In some embodiments, data stores 620 may be integrated within one or more other system devices, such as content provider servers 640 or feedback analytics servers 610. In other cases, when data stores 620 are implemented on separate computer servers, the servers 620 may maintain continuously expanding sets content feedback data, and then securely transmit the data to one or more analytics servers 610 for evaluation. In order to perform these tasks and others described herein, data stores 620 may include a single computer server or combination of servers, storage devices, network components, etc. In some embodiments, data stores 620 in FIG. 6 may correspond to the same data store servers 104 in FIG. 1 and/or FIG. 3, and may include some or all of the same hardware, software, storage and network components described above.

Figure 7:
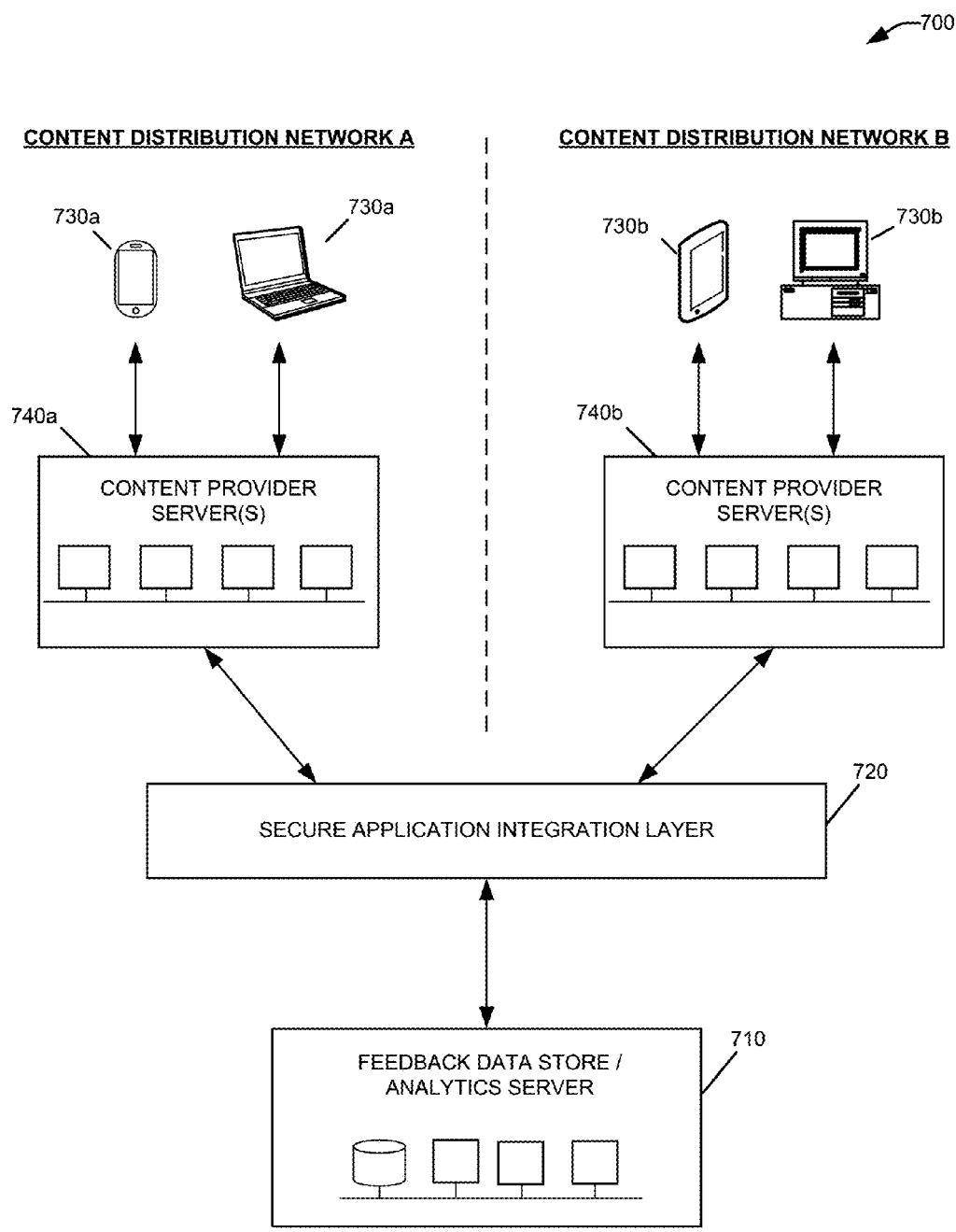
FIG. 7 is a block diagram illustrating another example system for receiving and analyzing user feedback data and calculating sentiment for various feedback aggregations and contexts, according to one or more embodiments of the disclosure.

Referring now to FIG. 7, a block diagram is shown illustrating another example of a sentiment analyzer system 700 for receiving and analyzing user feedback data from multiple content distribution networks. In this example, content feedback data collected by multiple different CDNs may be securely stored and transmitted to a content feedback data store and analytics server 710. Thus, in sentiment analyzer system 700 and other examples, related sets of content feedback may be collected across multiple CDNs and then grouped and analyzed together by a central analytics server 710. For instance, the multiple CDNs shown in FIG. 7 may correspond to different enterprise CDNs that sell similar sets of products online, or distribute similar sets of media content online, such as music, movies, games, television programming, and the like. In this case, the central analytics server 710 may be designed to receive and analyze content feedback (e.g., product reviews, media content reviews, user forum comments, online discussion posts, etc.), and determine sentiment scores and corresponding outputs that may be provided to some or all of the CDNs from which the content feedback was received. As another example, the multiple CDNs shown in FIG. 7 may correspond professional training and/or educational CDNs, and the central analytics server 710 may be designed to receive and analyze user feedback regarding training courses or classes, modules, assignments, presentations, presenters, and the like. Additionally, although only two content distribution networks 100 are shown in this example (i.e., CDN A and CDN B), similar system architectures may be used to collect and analyze combined content feedback from any number of CDNs.

Content provider servers 740a and 740b may be similar or identical to the content provider servers 640 in FIG. 6. As discussed above, these content provider servers 740a and 740b may include content data stores, along with security and authentication components, to store and manage access to sets of content items. Content provider servers 740a and 740b may each provide content to their respective pluralities of users via client devices 730a and 730b and/or may receive feedback from client devices 730*a* and 730*b* regarding content. Thus, the content provider servers 740*a* and 740*b* and client devices 730*a* and 730*b* shown in FIG. 7 may include some or all of the same hardware, software, storage and network components described above in reference to FIGS. 1-5.

Sentiment analyzer system 700 also includes a feedback data store and analytics server 710. Feedback data store and analytics server 710 may include various components and subsystems to receive, store, and analyze content feedback data collected within the multiple CDNs 100, as well as components and subsystems to calculate sentiment for individual feedback data and various aggregations of feedback data. The feedback data store and analytics server 710 may include similar or identical hardware and software components to those in the data store servers 620 and the feedback analytics server 610, described above. In order to perform the tasks and functions described herein, the feedback data store and analytics server 710 may be implemented within a single computer server or system, or as a combination of multiple computing devices, storage systems, and network components. Like the feedback analytics server 610, server 710 may be implemented by various different computing architectures, including web-based or service-based architectures, cloud computing architectures, and other distributed computing environments.

Additionally, the sentiment analyzer system 700 in this example includes a secure application integration layer 720. In some embodiments, the secure application integration layer 720 may control the transmission of feedback data, sentiment analyzer output data, user data, content data, and other related information between the feedback analytics server 710 and the multiple CDNs 100. For example, the secure application integration layer 720 may be configured to permit transmission of certain data from the content provider servers 740 to the feedback analytics server 710, such as content feedback data, content reference identifiers, user reference identifiers, times and dates, device identifiers and characteristics, etc., but not to permit transmission of other types of data, such as the actual content items, user names, or any other secure or personal user data. Thus, the secure application integration layer 720 may be configured to provide data security and/or data anonymity for CDNs, while allowing the applications hosted by the feedback analytics server 710 to receive the necessary content feedback data.

Although the secure application integration layer 720 in illustrated as a separate component in FIG. 7, this layer may be implemented within the hardware, software, and network components of the content provider servers 740 and/or the feedback analytics server 710. For example, the secure application integration layer 720 may correspond to a set of standards and protocols used for secure data storage and transmission, such as Learning Tools Interoperability (LTI) and other similar sets of standards for functionally connecting CDN platforms with externally-hosted applications.

Figure 8:
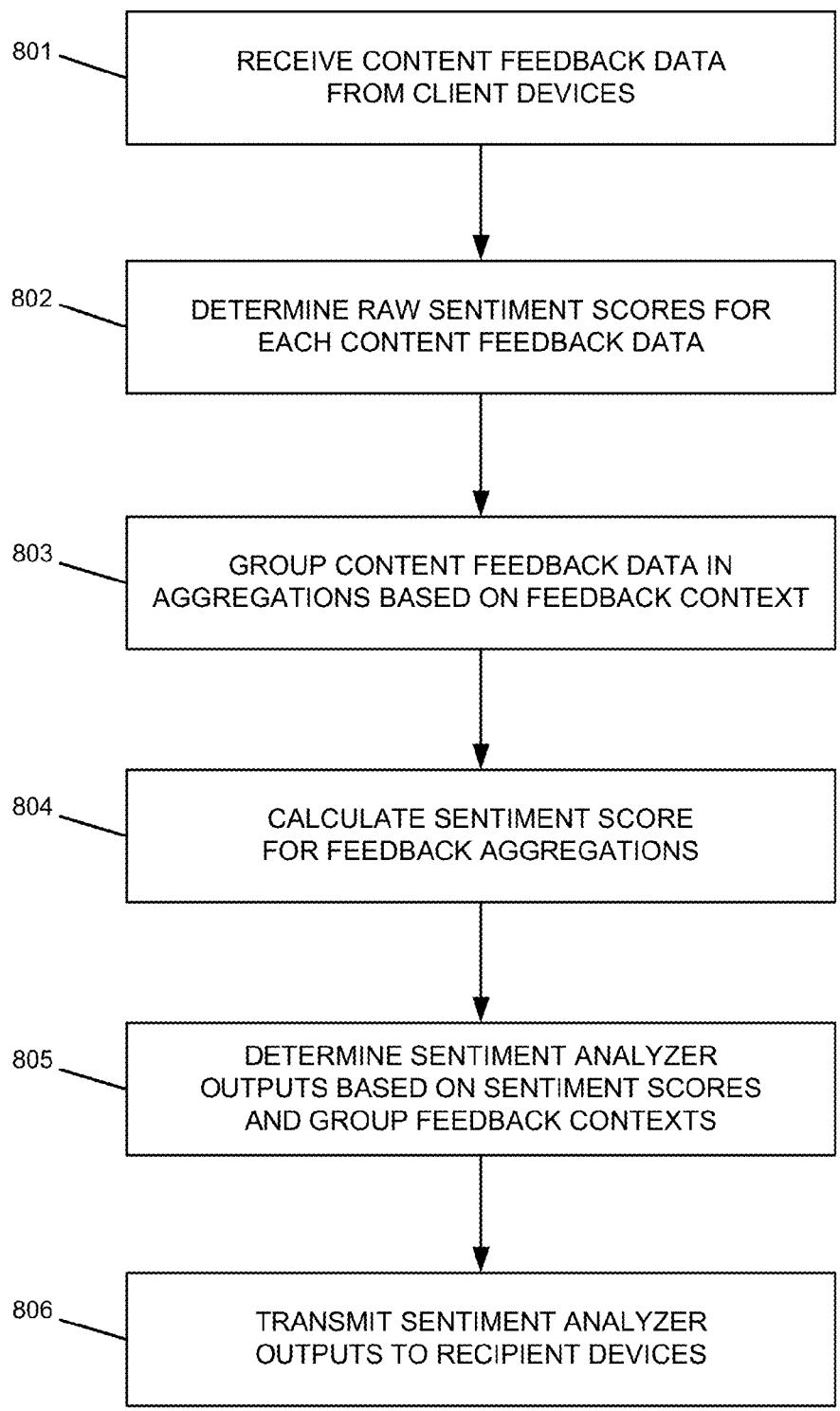
FIG. 8 is a flow diagram illustrating an example process of grouping and analyzing content feedback data, according to one or more embodiments of the disclosure.

Referring now to FIG. 8, a flow diagram is shown illustrating a process of grouping and analyzing content feedback data, and determining sentiment analyzer outputs based on sentiment score calculations. As described below, the steps in this process may be performed by one or more components in the example sentiment analyzer systems 600 or 700, such as content provider servers 640, client devices 630, data store servers 620, and feedback analytics servers 610. However, it should be understood that the analyses and grouping of content feedback data, calculations of sentiment scores, and determinations of sentiment analyzer outputs described herein need not be limited to the specific systems and hardware implementations described above in FIGS. 1-7, but may be performed within other computing environments comprising other combinations of the hardware and software components described herein.

In step 801, one or more content feedback datum/data (referred to herein as "data" in singular or plural form for purposes of clarity; the term "data" is not limited to multiple data) is received, for example, by a feedback analytics server 610 (or 710). The content feedback data received in step 801 may include user comments, responses, or any other data relating to user reactions to specific content items. As mentioned above, the content feedback data received in some embodiments may include text-based user comments, online discussion posts, product reviews, course or instructor evaluations, emailed questions or responses, and the like, provided by users via client devices 630. The nature and characteristics of the feedback may depend on the functional purpose and design of the CDN 100. For example, for eCommerce CDNs, online product sales CDNs 100, media distribution CDNs, interactive gaming CDNs, and the like, the content feedback data received in step 801 may include user product reviews, media content reviews, and other user feedback. For eLearning CDNs 100 used for distance learning, professional training, and other web-based educational content distribution, the content feedback data received in step 801 may include user discussion posts, questions and answers submitted by users, and other comments regarding courses, modules, assignments, instructions/presenters, and the like. For social networking, interactive gaming, and dating CDNs 100, the content feedback data received in step 801 may include user discussion posts, invitations, questions and responses, and other user-provided actions.

Additional or alternatively to text-based feedback data, in some embodiments the content feedback data received in step 801 may include multimodal data such as voice, image, and/or video user feedback data. As discussed below, audio feedback data (e.g., audio posts, questions, responses, comments, etc.) may be submitted by phone, voicemail, a voice-over-IP (VoIP) service, and/or using a microphone and audio processing subsystem within the client device 630. Additionally image and/or video may be submitted by MMS, video chat, video blog postings, video conferencing technologies, and the like, using integrated and/or peripheral cameras, and video processing, compressing, and transmission subsystems operating at the client device 630.

The content feedback data received in step 801 also may include various metadata and/or properties relating to the user comments, responses, or any other user reaction data, in addition to the user comments, responses, and reactions themselves. For example, if the content feedback data includes an online discussion post submitted by a user via a client device 630, the same (or a related) content feedback data transmission may include a set of metadata and properties for the online discussion post, such as a user identifier feedback provider, one or more content identifiers to which the feedback relates, times and dates associated with the feedback, a client device identifier associate with the feedback, a CDN identifier associated with the feedback, identifiers corresponding to other related feedback items (e.g., previous or subsequent posts on the same discussion thread) and/or identifiers corresponding to other related users associated with the content or the user providing the feedback.

The content feedback data received in step 801 may include a single item of content feedback recently submitted by a user via a client device 630 (e.g., an emailed question, online discussion post, an evaluation of a training session or presenter, or a review of a product, person, or business), or may include one or more sets of multiple feedback items. In some embodiments, an event streaming service implemented at one or more client devices 630, content providers 640, and/or data stores 620 may be configures to receive, analyze and stream selected events to the feedback analytics server 610 in real-time or near real-time. Additionally or alternatively, the feedback analytics server 610 may be configured to use data access components to retrieve batches of content feedback data from data stores 620 and/or content providers 640. In either implementation, such systems 600 (or 700) may be configured to provide all content feedback data generated within the system to the feedback analytics server 610, or may filter or otherwise restrict the feedback so that the feedback analytics server 610 only receives feedback data relating to specific content, specific users, specific devices, and/or specific CDNs, etc.

In step 802, one or more raw sentiment scores may be determined for each individual content feedback data received in step 801. For example, referring to the illustrative sentiment analyzer system 600 in FIG. 6, the feedback analytics server 610 may use a sentiment NLP neural network 660 to determine a raw sentiment score for each content feedback data received in step 801. In some such embodiments, the feedback analytics server 610 may provide each text-based feedback data (e.g., discussion posts, product reviews, comments, answers, questions, etc.) to the input nodes of the trained sentiment NLP neural network 660, and may receive the corresponding raw sentiment scores from the output nodes of the neural network 660. Such sentiment NLP neural network 660 may be trained to determine user sentiment from text, for example, based on identified keywords, wording, phrases, punctuation, and the like. In some examples, a numeric raw sentiment score (e.g., between 0 and 10, between −1 and 1, etc.) may be determined for each individual content feedback data.

Although a trained sentiment NLP neural network 660 is shown in FIG. 6, it should be understood that other techniques may be used for determining raw sentiment scores from content feedback in other implementations. For example, other NLP engines may be implemented to analyze text-based user input and determine sentiment scores based on emotion keywords, phrasing, use of punctuation, use of capitalization, use of emoticons, use of repetition, length of text, spelling or grammar errors (indicating annoyance or haste), and the like. Additionally, a sentiment scoring engine 660 may use any of the feedback metadata and other related data to further determine the raw sentiment scores. For example, a sentiment scoring engine 660 may use information associated with the received feedback (e.g., a star rating associated with a review, a test or class score associated with a discussion post in an eLearning system, etc.), as well as related feedback data (e.g., sentiment scores of previous comments within the same thread, by the user, etc.). Moreover, the sentiment NLP neural network 660 (or other sentiment scoring engine 660) may be a implemented within the sentiment analyzer system 600 as a separate and divisible component that may be periodically upgraded or replaced without impacting the operation of the other components of the sentiment analyzer system 600.

Additionally, as discussed below in more detail, the sentiment NLP neural network 660 (or other sentiment scoring engine 660) may be implemented to determine sentiment scores for specific contexts or functional purposes of CDNs 100. For example, different categories of sentiment, as well as different keywords and other sentiment analysis techniques, may apply when analyzing content feedback from CDNs designed as professional training/eLearning systems, or CDNs 100 designed as online product sales or media distribution platforms, or CDNs 100 designed as interactive gaming, social networking applications, and so on. Thus, the determination of raw sentiment scores in step 802 may include routing the content feedback data to one of a plurality of different sentiment scoring engines 660 based on the context and functional purpose of the CDN 100 from which the content feedback data originated.

In step 803, the content feedback data received in step 801 may be grouped in one or more aggregations based on the context of the feedback data. The context of the feedback data may include a combination of metadata and properties of the feedback data, the functional purpose of the CDN 100 from which the feedback data was received, and any other information relating to the feedback data. For instance, the content feedback data may be grouped into aggregations based on the author(s) of the feedback, the recipient(s) of the feedback, the subject(s) of the feedback, etc. In some cases, the feedback analytics server 610 may be designed to group content feedback data in accordance with preprogrammed grouping logic. For instance, a feedback analytics server 610 for product or media reviews may be designed to group the product/media feedback by the author of the review and by the products or media reviewed. Additionally or alternatively, the feedback analytics server 610 may be designed to dynamically retrieve, group, and/or analyze content feedback aggregations based on requests from content providers 640, client devices 630, or other authorized system users. For example, a content provider server 640 or administrative user within a professional training or educational CDN 100 may transmit a request to the feedback analytics server 610 to retrieve and analyze feedback from a specific user (e.g., trainee, student, employee, etc.) or relating to a specific presenter (e.g., teachers, instructors, etc.) or a specific courses, modules, or assignment. In such examples, the feedback analytics server 610 may be configured to receive sentiment analysis requests from content providers 640 and other authorized users, and then to retrieve, group, and analyze specific aggregations of content feedback data based on the feedback metadata and criteria in the requests.

Grouping the individual content feedback data into aggregations in step 803 may also include grouping by time and date, and grouping feedback by the CDN(s) 100 from which the feedback originated. Moreover, the different aggregations that may be potential created may depend on the functional purpose and design of the sentiment analyzer system 600 and/or CDNs 100 supplying the content feedback data. For example, in a sentiment analyzer system 600 and/or CDNs 100 implemented as professional training or educational systems, the content feedback data may be grouped by learners/trainees, instructor/presenters, educational/training content, and/or similar groupings. For example, a feedback analytics server 610 associated with an professional training or eLearning system may group feedback provided by a single user (e.g., an aggregation of all feedback provided by a specific student or trainee), or a group of users (e.g., an aggregation of all feedback provided by a class or grade of students or trainees). The feedback analytics server 610 also may group feedback regarding a single user (e.g., an aggregation of feedback provided by all students/trainees about a specific instructor, presenter, administrator, or another student/trainee), or regarding a group of users (e.g., an aggregation of feedback provided by all students/trainees about all instructors or presenters for a particular course or subject). Additionally, the feedback analytics server 610 may group feedback relating to one or more assignments, topics, tests, quizzes, assessments, courses, modules, chapters, and the like (e.g., an aggregation of feedback provided by all trainees about a specific course module, an aggregation of feedback provided by all students about a specific reading assignment, etc.). Moreover, any of potential groupings of content feedback discussed herein may be combined and/or further grouped or filtered based on the properties and metadata of the feedback data (e.g., an aggregation of feedback provided by all employees that attended a human resources lecture by a specific presenter, an aggregation of feedback provided by all trainees that attended a technical training course using a specific type of computing device, an aggregation of feedback provided by all students that take an advanced math class in first period, etc.).

In other examples, a feedback analytics server 610 associated with an online product sales or online media distribution system may group feedback relating to individual products or media (e.g., an aggregation of feedback provided by all purchasers of a specific products or viewer/listener of a specific media content item), or relating to groups of products or media (e.g., an aggregation of feedback provided by all purchasers of a product within a specific product line or type from a manufacturer, or viewer/listener of any of a specified group of media content items). The feedback analytics server 610 in such cases may also group feedback relating to individual users or groups of users (e.g., an aggregation of all feedback provided by a specific reviewer for all products and/or media). Potential groupings also may include various combinations of these grouping criteria and/or may be further grouped or filtered based on the feedback properties and metadata (e.g., an aggregation of all feedback provided by all users from a specific geographic region relating to a specific product line, an aggregation of all feedback provided by all users for a specific media content item in a specific time period, etc.).

Additionally, in still other examples, a feedback analytics server 610 associated with a social network, interactive gaming system, or online dating system may group feedback relating to individual persons/players (e.g., an aggregation of feedback provided by a specific user, an aggregation of feedback provided by all users relating to a user's personal profile), or may group feedback relating to individual content or groups of content (e.g., an aggregation of feedback provided by all users relating to an online discussion post, interactive game or game level, etc.). As discussed above, potential groupings also may include various combinations of these grouping criteria and/or may be further grouped or filtered based on the feedback properties and metadata (e.g., an aggregation of all feedback provided by all users having certain demographic criteria to a user's online profile or discussion post, an aggregation of all feedback provided by all gamers having a certain gaming achievement level to a new interactive online game, etc.).

In step 804, one or more sentiment scores may be calculated for the aggregations of content feedback data determined in step 803. In various embodiments, the calculation of a sentiment score for a feedback aggregation may be performed by calculating an average mean or median of the individual raw sentiment scores for the feedback data within the aggregation, or by using a variety of statistical/mathematical techniques on the underlying data. An example of one such technique is described in the below paragraphs, but it should be understood that the technique described is not limiting, and that other such statistical/mathematical techniques may be used in different embodiments.

In some embodiments, the calculation of a sentiment score for a aggregation of content feedback data in step 804 may be a multi-step mathematical process including (a) calculating the mean of the individual raw sentiment scores for the feedback data within the aggregation, (b) calculating a Z-score for the feedback aggregation, (c) calculating a stanine score for the aggregation, and (d) calculating an overall sentiment score for the aggregation. In certain example, each raw sentiment score for an individual an feedback data may be a numeric value between −1 and 1, where strongly negative content feedback may be assigned a raw sentiment score at or near −1, strongly positive content feedback may be assigned a raw sentiment score at or near 1, and neutral content feedback may be assigned a raw sentiment score at or near 0. The mean of all individual raw sentiment scores may be calculated, which, in this example, also may be a numeric value between −1 and 1. Using the calculated mean, a Z score may be computed for the feedback aggregation using the following equation:

$$Z\ Score\ (z) = (\chi - \mu)/\sigma$$

where $\chi$ is the aggregate (or sum) of the individual raw sentiment scores, $\mu$ is the calculated mean of the individual raw sentiment scores, and $\sigma$ is the standard deviation of the individual raw sentiment scores. In this example, the Z score may be a numeric value between −2 and 2. Using z, the Z Score calculation, a stanine score may be calculated for the feedback aggregation using the following stanine formula:

$$Stanine\ Score = 2z + 5$$

In this example, the resulting stanine score may be a numeric value between 1-9. Finally, the stanine score may be used to calculate an overall sentiment score for the feedback aggregation, based on the following mapping between ranges of stanine scores and corresponding sentiment scores:

Stanine Score Range 1-3=Sentiment Score 1 (very negative)

Stanine Score 4=Sentiment Score 2 (somewhat negative)

Stanine Score 5=Sentiment Score 3 (neutral)

Stanine Score 6=Sentiment Score 4 (somewhat positive)

Stanine Score Range 7-9=Sentiment Score 5 (very positive)

Thus, in the above example, a numeric integer between 1-5 may be calculated in step 804 as the overall sentiment score for any feedback aggregation. However, as noted above, different mathematical/statistical techniques may be used in different examples. In various examples, sentiment scores for feedback aggregations may be numerical or non-numerical, or may include various ranges of integer or decimal values, and negative or positive values. Additionally, in some examples, multiple sentiment scores may be calculated for different sentiment aspects of a single feedback aggregation in step 804. For example, depending on the type and characteristics of the sentiment analyzer system 600 and the received content feedback data, a feedback analytics server 610 may calculate multiple sentiment scores (e.g., an entertainment sentiment score and a separate educational sentiment score, a positive sentiment score a separate negative sentiment score, different sentiment scores corresponding to different emotions, etc.) for the same feedback aggregation.

In step 805, the feedback analytics server and/or other components of the sentiment analyzer system 600 may determine one or more outputs based on the sentiment score(s) calculated in step 804, as well as recipients for the sentiment analyzer outputs. In some cases, the sentiment analyzer outputs determined in step 805 may simply include the sentiment score calculated in step 804. In such cases, the recipient output devices to receive the sentiment scores may include, for example, content provider servers 640 (e.g., for content evaluation), various types of client devices 630 (e.g., for sentiment analyses and comparisons among users), and/or data store servers 620 (e.g., for storage and future analyses of sentiment score data).

In certain embodiments, the outputs of the sentiment analyzer may be determined in accordance with preprogrammed or dynamically implemented rules and/or criteria. For example, sentiment analyzer output rules may be based on sentiment score thresholds, whereby the feedback analytics server 610 may transmit notifications to predetermined recipients only if a sentiment score calculated in step 804 is greater than a specified threshold, less than a specified threshold, etc. In some cases, certain recipient devices may receive notifications for certain sentiment score thresholds or ranges, while other recipients may receive notifications for other sentiment score thresholds or ranges. In other examples, sentiment analyzer output rules may be based on changes in sentiment scores over time, or identifications of outliers within multiple related sentiment scores. For instance, in professional training or educational system 600, a content provider server 640, authorized client device 630, or other recipient device may receive a notification if the sentiment score for a user (e.g., employee or student), group of users (e.g., class or grade), an instructor or presenter, or one or more content items (e.g., a course, module assignment, test, etc.) falls below a certain threshold. Similarly, in a sentiment analyzer system 600 used with an eCommerce or media distribution system, a content provider 640 or client device 630 may receive a notification in response to unanticipated high or low sentiment scores for a product, product line, or media content, recent changes in sentiment scores for a product or media content, and the like.

In order to implement such sentiment analyzer output rules and criteria, the feedback analytics server 610 (other components of the sentiment analyzer system 600) may include a rules engine configured to receive, store, and implement various sentiment analyzer output rules. Output rules may be received, for example, from content providers 640, client devices 630, and/or other computing devices or systems described herein. Such rules may be received and implemented in advance, or during ongoing an process of receiving and analyzing streaming content feedback data.

In step 806, the sentiment analyzer outputs determined in step 805 may be transmitted to the output recipient devices identified in step 805. For example, a feedback analytics server 610 (or 710) in a sentiment analyzer system 600 (or 700), may transmit sentiment scores and/or other sentiment analyzer outputs to content provider servers 640, various client devices 630, and/or data store servers 920. In some cases, rule-based notifications may be provided to mobile devices 630 of content consumers (e.g., customers, employees, students, etc.), content presenters (e.g., authors, instructors, bloggers, etc.), and/or system administrators. Such notifications may be provided via email, text message, voice message, or via a mobile software application executing on the user's mobile device 630.

In some embodiments, multimodal sentiment analyzers may receive, parse, and analyze multimodal content feedback data. As described below, various implementations may include video, image, and/or audio capture devices and capabilities, along with processing and synchronization systems to analyze the video, image, and/or audio data and calculate sentiment scores based on multimodal feedback. Although the examples below describe multimodal content feedback data such as voice and image/video data, it should be understood that multimodal sentiment analyzers may include additional feedback capture devices and data analyzers for calculating sentiment based on any other modes of user feedback.

Figure 9A:
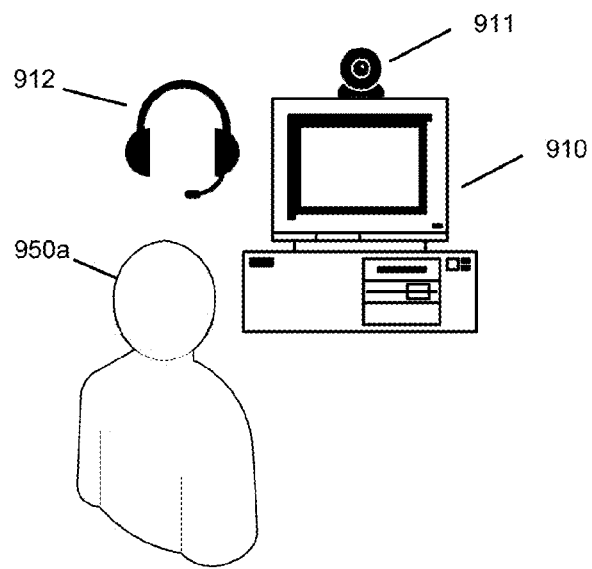
FIGS. 9A and 9B are diagrams illustrating two examples of multimodal feedback data capture systems, according to one or more embodiments of the disclosure.
Figure 9B:
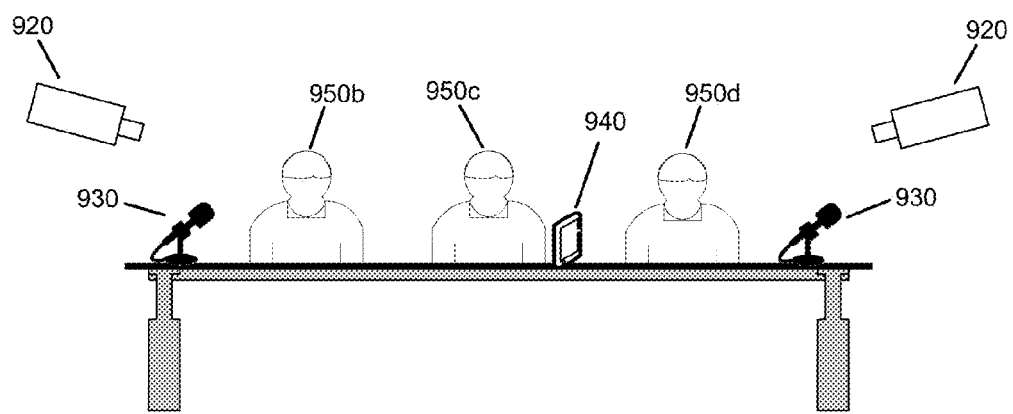

Referring now to FIGS. 9A and 9B, two examples are shown of multimodal feedback data capture systems. In FIG. 9A, a desktop computer client device 910 is shown with an associated camera 911 and headset with microphone 912. In this example, client device 910 may correspond to one of the client devices 630 of the sentiment analyzer system 600, and may include some or all of the hardware, software, and networking components discussed above. Although the camera 911 and the headset/microphone 912 are shown as separate peripheral devices to the desktop computer 910 in this example, in other cases, client devices 630 such as mobile phones, tablet computers, and the like, may include integrated cameras, microphones, and other multimodal feedback data capture devices.

Additionally, in some embodiments, multimodal data capture devices such as cameras and microphones need not be associated with specific client devices 630. For instance, referring now to FIG. 9B, cameras 920 and microphones 930 may be used to capture video, image, and audio feedback from one or more users independent of any client devices 630. In contrast to implementations like FIG. 9A which may be used to capture multimodal feedback from a specific user at a personal workstation, office computer, or mobile device, the example implementation in FIG. 9B may capture multimodal feedback from users with or without client devices 630, in environments such as classrooms, conference rooms, etc. In this example, multiple cameras 920 and microphones 930 are used to capture video, image, and audio feedback from three users 950, only one of which (950c) is operating a client device 940. Thus, as described below, certain multimodal sentiment analyzer systems 600 may calculate sentiment based on multimodal feedback data in conjunction with text feedback data (e.g., for users 905a and 950c), while other such systems may calculate sentiment based on multimodal data even when no text feedback data from users is available (e.g., for users 905b and 950d).

Figure 10:
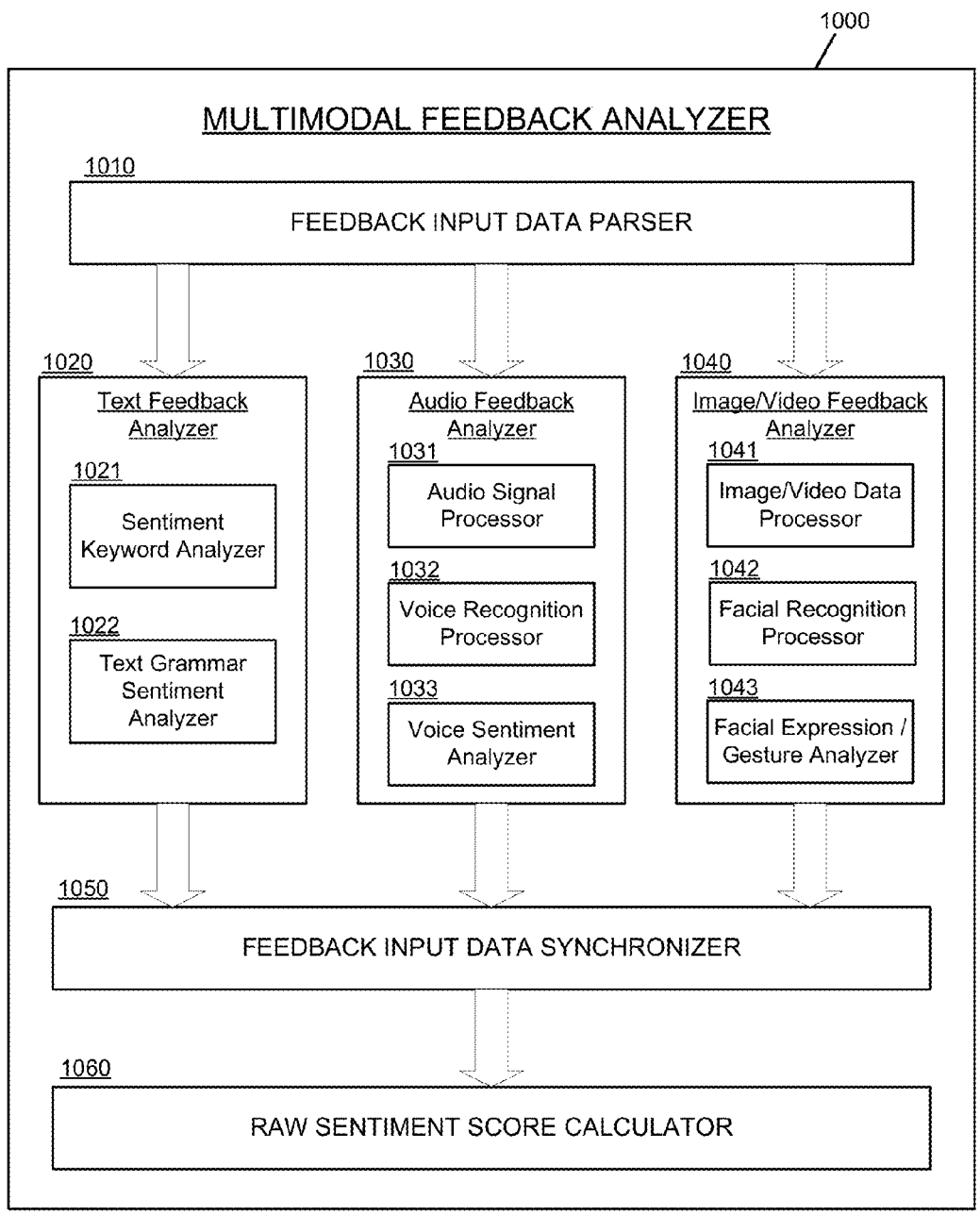
FIG. 10 is a block diagram illustrating an example multimodal feedback analyzer for receiving and analyzing multimodal user feedback data and calculating raw sentiment scores, according to one or more embodiments of the disclosure.

Referring now to FIG. 10, a block diagram is shown illustrating an example multimodal feedback analyzer for receiving and analyzing multimodal user feedback data and calculating raw sentiment scores for the feedback. In some embodiments, the multimodal feedback analyzer 1000 (and/or the individual mode feedback analyzers 1020-1040) may be implemented as one or more separate computing systems associated with sentiment analyzer systems 600 and/or content distribution networks 100. For example, multimodal feedback analyzer 1000 may be implemented using computer server hardware, software, and network technologies in a web-based environment, cloud computing environment, or other client-server architectures. In other embodiments, the multimodal feedback analyzer 1000 (and/or the individual mode feedback analyzers 1020-1040) may be integrated as a dedicated hardware/software subsystem, component, or service within another server or device of a sentiment analyzer system 600, such as a feedback analytics server 610, content provider server 640, or client device 630. In both cases, the multimodal feedback analyzer 1000 may be configured to receive requests including secure (e.g., encrypted) multimodal user feedback data from various devices within sentiment analyzer systems 600 and/or content distribution networks 100, authenticate the devices and users associated with the requests, analyze the multimodal user feedback data, and respond via secure network channels.

The multimodal feedback analyzer 1000 includes a feedback input data parser 1010 that may receive and parse different modes of user content feedback data (e.g., text, voice/audio, image/video, etc.). Feedback input data parser 1010 may include one or more network interfaces, authentication components, and a set of hardware/software components for parsing and converting structured and/or unstructured feedback data received via the sentiment analyzer system 600. The feedback input data parser 1010 may identify the mode (or type) of the feedback data, and then route the data to the corresponding mode feedback analyzer 1020, 1030, 1040, etc.

Text feedback data, such as online discussion posts and responses, emails, instant messaging and online chat content, text-based reviews or evaluations, and the like, may be routed to the text feedback analyzer 1020. Text feedback analyzer 1020 may include various subcomponents such as a sentiment keyword analyzer 1021 configured to parse feedback text and identify specific keywords associated with different sentiments and/or levels, and a text grammar sentiment analyzer 1022 configured to identify grammatical features or patterns within feedback text associated with different sentiments and/or levels. The sentiment keyword analyzer 1021 and text grammar sentiment analyzer 1022, along with other subsystems/subcomponents (e.g., an optical character recognition processor, language conversion tools, etc.) may be implemented with dedicated or shared computing resources such as processors or processing engines, secure memory, caching, networking components, etc.

Voice data and other audio feedback data, such as live or recorded audio discussion posts, voice chat or voice messages, and the like, may be routed to the audio feedback analyzer 1030. Audio feedback analyzer 1030 may include, for example, an audio signal processor 1031 (e.g., analog-to-digital converter and digital signal processor) to receive and process audio files or streaming audio data, a voice recognition processor 1032 to identify both speakers and spoken words from digital audio data, and a voice sentiment analyzer 1033 to determine sentiments and/or sentiment levels based on digital voice data and/or background audio data (e.g., music, typing, background noise or conversation, etc.). Subsystems and subcomponents 1031-1033 within the audio feedback analyzer 1030 may be implemented with dedicated or shared computing resources such as processors or processing engines, secure memory, caching, networking components, etc.

Image and/or video feedback data, such as video chat data, video conference, video blog content, video recordings of questions and responses, image or video of user expressions or gestures in responses to various content, and the like, may be routed to the image/video feedback analyzer 1040. The image/video feedback analyzer 1040 may include, for example, image data and/or video data processors 1041 to receive and process image or video files or streaming video, a facial recognition processor 1042 configured to identify specific users from image or video data by comparing the video feedback data to a previously stored data stores of user images or videos, and facial expression and/or gesture analyzers 1043 to analyze image or video data of a user and determine sentiments and/or sentiment levels based on the user's expressions, gestures, posture, eye movement, etc.

Multimodal feedback analyzer 1000 also includes a feedback input data synchronizer 1050 and a raw sentiment score calculator 1060. As discussed below, the feedback input data synchronizer 1050 may be configured to receive the outputs of multiple individual mode feedback analyzers 1020-1040 and synchronize those outputs for specific users and specific feedback content. For example, an output from the text feedback analyzer 1020 (e.g., an online discussion post, review, or other content typed by a user) may be time-synchronized with the associated output from image/video feedback analyzer 1040 (e.g., image or video data of the user when writing the text feedback). The raw sentiment score calculator 1060 may receive the synchronized outputs of the multiple individual mode feedback analyzers 1020-1040 and calculate one or more raw sentiment scores for specific users and/or specific feedback content data. The feedback input data synchronizer 1050 and raw sentiment score calculator 1060 may be implemented as combined/integrated computing systems with dedicated hardware, software, and networking resources, or a separate computing subcomponents with shared resources.

Figure 11:
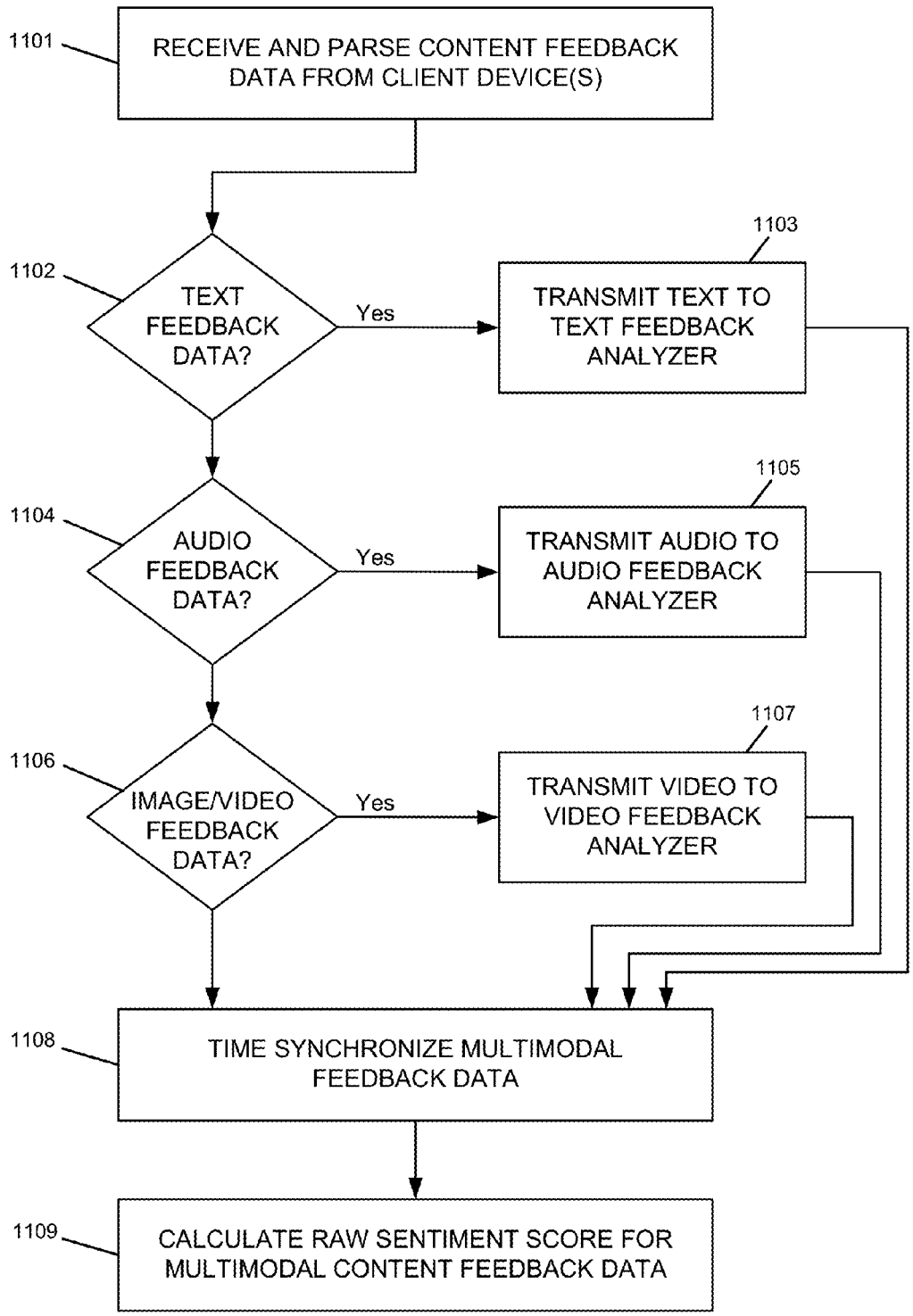
FIG. 11 is a flow diagram illustrating an example process of analyzing and calculating raw sentiment scores for content feedback data, according to one or more embodiments of the disclosure.

Referring now to FIG. 11, a flow diagram is shown illustrating a process of analyzing and calculating raw sentiment scores for content feedback data, including both uni-modal and multimodal content feedback data. The steps in this process may be performed, for example, by a multimodal feedback analyzer 1000 operating within or in collaboration with the various component servers and devices of a sentiment analyzer system 600 or 700. However, it should be understood that the parsing, analyses, and synchronization of multimodal feedback data, and the calculations of sentiment scores described herein need not be limited to the specific systems and hardware implementations described above in FIGS. 1-10, but may be performed within other computing environments comprising other combinations of the hardware and software components described herein.

In step 1101, one or more content feedback data is received and parsed, for example, by a multimodal feedback analyzer 1000. The content feedback data may include various data formats, such as media files (audio and/or video), image files, text files, data from streaming or event-based data sources, and the like. In some cases, the content feedback data received in step 1101 may include a single file from a single client device 630 (e.g., a digital video or movie file type). In other cases, related content feedback data may be received in step 1101 in multiple different files (or streams or other transmissions) and/or from multiple device client devices 630. For example, as shown in FIGS. 9A and 9B, multiple feedback data capture devices may be used to collect multimodal feedback data associated with the same user and/or same time period. Thus, the content feedback data received in step 1101 may include image or video data from cameras 911 or 920, audio data from microphones 912 and 930, text data received via user devices 911 and 940, and so on.

After receiving the content feedback data in step 1101, the multimodal feedback analyzer 1000 may parse the data based on mode (or type), for example, into text feedback data, voice/audio feedback data, image/video feedback data, etc. The parsing into feedback mode in step 1101 may be performed based on a file type, streaming data source, content feedback metadata, or based on a data analysis. In some embodiments, certain multimodal data transmitters (e.g., cameras, microphones, client devices), may be associated with corresponding feedback data modes (e.g., image/video, audio, text), so that the multimodal parser may determine feedback data mode based solely on the device transmitting the data. In other cases, the multimodal parser may determine feedback data mode based on a media file type, file properties, metadata, and the like.

In step 1102, if the multimodal feedback received in step 1101 contains any text feedback data (1102:Yes), this text feedback data may be transmitted to a text feedback analyzer in step 1103. For example, online discussion posts and responses, emails, instant messaging and online chat content, text-based reviews or evaluations, and the like, may be transmitted to a dedicated text feedback analyzer 1020.

Within the text feedback analyzer 1020, the text feedback data may be parsed and analyzed to determine sentiment using various techniques and processes such as those discussed above in step 802. For example, in some embodiments, a trained sentiment NLP neural network 660 may be used to determine a raw sentiment score for each text feedback data. Sentiment NLP neural networks as well as other alternative techniques, may be implemented to determine user sentiment by identifying a set of sentiment keywords and/or analyses of phrases, length, wording, punctuation, capitalization, repetition, grammar, emoticons, and the like. Additionally, as discussed below in more detail, the text feedback analyzer 1020 may be implemented to determine sentiment scores for specific contexts or functional purposes of CDNs 100 (e.g., professional training/eLearning systems, online product sales, media distribution platforms, interactive gaming, social networking, etc.).

In step 1104, if the multimodal feedback received in step 1101 contains any voice/audio feedback data (1104:Yes), this audio feedback data may be transmitted to an audio feedback analyzer in step 1105. For example, audio discussion posts, voice chat, voice messages, and the like, may be transmitted to a dedicated audio feedback analyzer 1030.

Within the audio feedback analyzer 1030, the voice/audio feedback data may be parsed and analyzed to determine sentiment using various techniques and processes. In some embodiments, voice data may be identified and isolated from other non-voice data in order to better analyze the sentiment associated with the voice feedback data. Further, when multiple voices are contained within the same voice/audio feedback data (e.g., a two person conversation, or multi-person chat or discussion, etc.), the audio feedback analyzer 1030 may isolate individual user voices for separate sentiment analyses. For each individual voice pattern isolated within the voice/audio feedback data, the audio feedback analyzer 1030 may determine one or more sentiment and/or sentiment levels (or magnitudes) based on voice characteristics such as speech volume, speed, tone, pitch, inflection, and emphasis. Thus, sentiment scores may be determined for individual voice patterns corresponding to individual speakers within the voice feedback data.

Additionally or alternatively, one or more overall sentiment scores may be determined for a multi-person conversation or discussion. Such conversation sentiment scores or discussion sentiment scores may be based on the individual sentiment scores of the separate participants, as well as multi-user factors such as the percentages of speaking time/words of the different participants, pauses in conversation, instances of talking over or interrupting other participants, etc. Further, in some embodiments, an analysis of the non-voice data also may be performed when determining the individual sentiment scores and/or overall conversation or discussion sentiment scores for the received audio feedback data. For example, identification of audio patterns corresponding to music, television, typing, eating or drinking, background conversation noise, driving/traffic noise, and the like, may be used to determine sentiment and sentiment scores for individual users and/or overall discussions. Such background noises detected within the audio feedback, along with the conversation text and/or other contextual clues may indicate that a user is distracted or irritated.

In some embodiments, the audio feedback analyzer 1030 may analyze the voice/audio data to determine the specific words spoken by the user(s) within the feedback data. If the words spoken by the users can be determined from the audio data, then the audio feedback analyzer 1030 may use the words to perform the sentiment analysis. Alternatively or additionally, the audio feedback analyzer 1030 may transmit the spoken words to a text feedback analyzer 1020, along with time data, conversation data, speaker data, context data, etc., so that the text feedback analyzer 1020 may determine various sentiment types and scores as described above. However, even if the audio feedback analyzer 1030 cannot determine (or does not attempt to determine) the words spoken by the users within voice/audio feedback data, the audio feedback analyzer 1030 may still perform sentiment determinations based on speech volume, speed, tone, pitch, inflection, and emphasis, and the like.

Additionally, in some cases the audio feedback analyzer 1030 may analyze the voice/audio data to identify specific speakers within the feedback data. In some examples, the speaker identities may be automatically determined by the parser 1010 or analyzer 1030 based on the client device 630, microphone or other audio capturing device, or based on the user authentication, metadata, etc. The audio feedback analyzer 1030 also may identify individual speakers based on the audio data itself in some cases, for example, by determining voice patterns/characteristics and comparing the voice data to a previously-stored data store containing voice data from a plurality of system users. If one or more speakers can be identified for the voice/audio feedback data, the previously-stored voice pattern and characteristic data for the identified users may be used by the audio sentiment analyzer 1030. For example, the differences between a user's typical/baseline speech characteristics (e.g., speech volume, word-per-second, pitch, tone, emphasis etc.), and the user's corresponding speech characteristics in the newly received voice data, may indicate different sentiment types and/or levels. For instance, a user speaking louder, faster, and/or at a higher pitch than their normal speech patterns may indicate certain emotional states of the user, whereas the user speaking softer, slower, and/or at a lower pitch than their normal speech patterns may indicate different emotional states.

In step 1106, if the multimodal feedback received in step 1101 contains any image/video feedback data (1106:Yes), this image or video feedback data may be transmitted to an image/video feedback analyzer in step 1107. For example, video chat data, video conference, video blog content, video recordings of questions and responses, image or video of user expressions or gestures in responses to various content, and the like, may be transmitted to a dedicated image/video feedback analyzer 1040.

Within the image/video feedback analyzer 1040, the image/video feedback data may be parsed and analyzed to determine sentiment using various techniques and processes. If the image or video data shows multiple individuals, these individuals may be identified and isolated in some embodiments, and separate sentiment analyses may be performed for each individual. For each individual identified within the image/video feedback data, the image/video feedback analyzer 1040 may determine one or more sentiment and/or sentiment levels (or magnitudes) based on characteristics such as facial expressions, gestures, posture, eye position, eye movement, and the like. Additionally, in some cases, image or video data with multiple individuals may be analyzed to determine one or more sentiment scores for the multi-person image or video as a whole. For example, by analyzing the combination of eye movements, facial expressions, and gestures of multiple individuals in an image or video, image/video sentiment scores for multi-user interactions may be determined in addition to (or alternatively to) the sentiment scores for the individual users.

In some embodiments, the image/video feedback analyzer 1040 may analyze the image or video data to identify audio data and/or text data contained within the image/video data. For example, certain video file formats may contain audio data as well. Additionally, image or video data may contain text authored by a user of the video, such as images or videos from cameras at workstations (e.g., camera 911) or other locations (e.g., cameras 920) that show a user typing or writing text. In such examples, the audio or text data identified within the image/video feedback data may be used by the image/video feedback analyzer 1040 as part of the sentiment analysis. Alternatively or additionally, the image/video feedback analyzer 1030 may transmit the audio data or text data an audio/voice feedback analyzer 1030 or text feedback analyzer 1020, along with time data, conversation data, speaker data, context data, etc., so that the audio/voice feedback analyzer 1030 or text feedback analyzer 1020 may determine various sentiment types and scores as described above.

Additionally, in some embodiments, the image/video feedback analyzer 1040 may analyze the image or video data to identify specific individuals within the feedback data. In some examples, information identifying the individuals shown in images or video data may be automatically determined by the parser 1010 or analyzer 1040 based on the client device 630, camera or other video capturing device, or based on the user authentication, metadata, etc. The image/video feedback analyzer 1040 also may identify individuals shown in images or videos based on the image/video data itself in some cases, for example, using facial recognition software and comparing an individual's visible features to a previously-stored data store containing image data from a plurality of system users. If one or more individuals can be identified within the image/video data, a set of previously-stored image/video data for the identified individuals may be used by the image/video sentiment analyzer 1040. For example, the differences between a user's typical/baseline visual feedback features (e.g., facial expressions, eye movement patterns, speaking gestures, etc.), and the user's corresponding visual feedback features in the newly received image/video data, may indicate different sentiments and/or levels. For instance, hand gestures of certain characteristics may correlate with certain sentiments for some individuals but not for other individuals, and the same may be true for eye movement patterns, facial expressions, etc.

In step 1108, the output of one or more multimodal feedback analyzers may be synchronized by data capture time in order to correlate image/video data, audio/voice data, text data, and/or any other available multimodal feedback data. For example, a feedback input data synchronizer 1050 may receive and correlate the sentiment analyzer output/results data from one or more text feedback analyzers 1020, audio feedback analyzers 1030, and image/video feedback analyzers 1040. Though synchronization need not be required in some embodiments, it may be optional and even preferred in some cases, for example, when multimodal data is collected by different data capture devices and transmitted separately, asynchronously, and/or not in real-time to a multimodal feedback analyzer 1000. In order to synchronize multimodal data received from different feedback analyzers (e.g., 1020, 1030, and 1040), the synchronizer 1050 may use timestamp data generated by different input devices (e.g., client computing devices 630, microphones 930, cameras 920, etc.) and/or other contextual clues from the data itself.

Figure 12A:
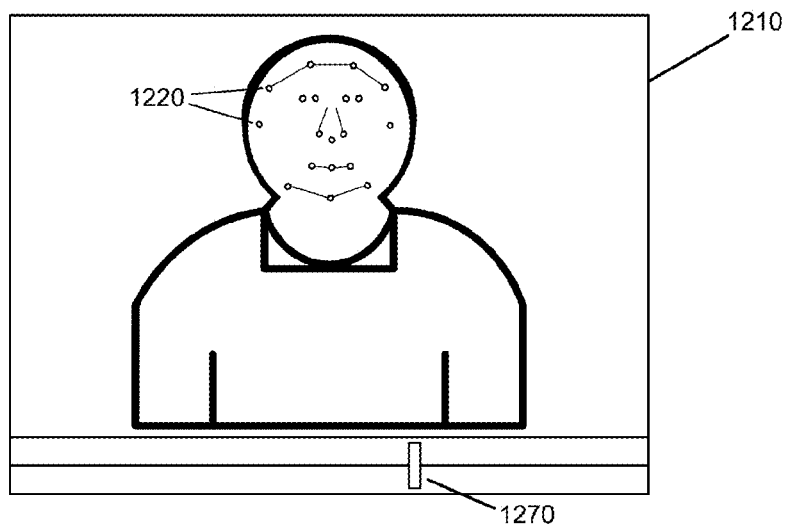
FIGS. 12A-12C are graphical examples of three synchronized content feedback data items, according to one or more embodiments of the disclosure.
Figure 12B:
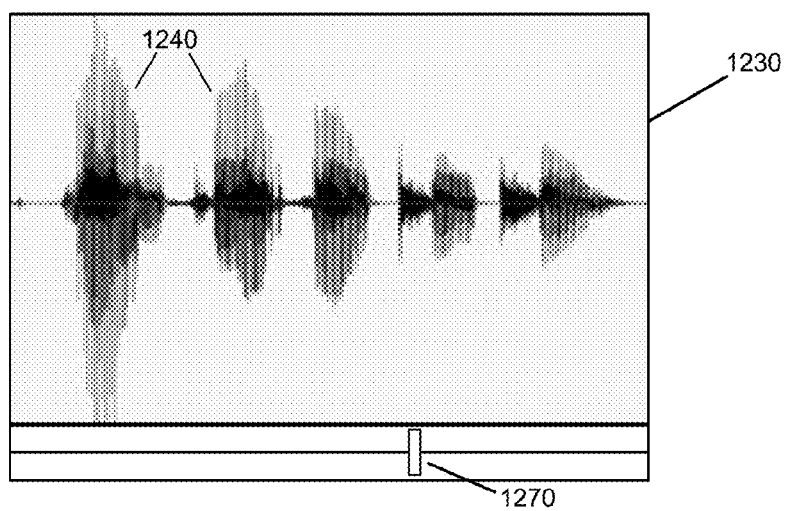
Figure 12C:
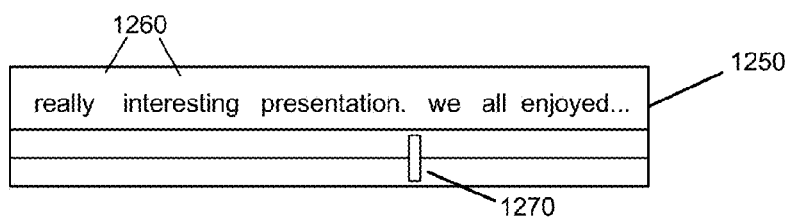

Referring briefly to FIGS. 12A-12C, an illustrative example is shown of synchronizing three separate content feedback data. FIG. 12A illustrates an example of video feedback data 1210 showing a facial expression analysis based on changes in facial features 1220 of a user. FIG. 12B illustrates an example of audio feedback data 1230 including voice patterns 1240. FIG. 12C illustrates an example of text feedback data 1250 contained a set of identified words 1260, which may be received from a text data capture device or derived from audio and/or video, as described above. In each of FIGS. 12A-12C, an illustrative user interface component 1270 showing the time synchronization of the video, audio, and text feedback data.

In step 1109, one or more raw sentiment scores may be calculated for the multimodal content feedback data received in step 1101, analyzed in steps 1101-1107, and synchronized in step 1108. In various embodiments, a sentiment score calculated in step 1109 may correspond to individual user's sentiment, or the sentiment of a group of users, at a particular time and/or associated with a particular action. For example, a raw sentiment score may be calculated for a user associated with an action taken by the user, such as composing and transmitting a discussion post, a text, audio, or video message, writing a review or evaluation of content, and the like. A raw sentiment score also may be calculated for a user associated with passive actions by the user, such as viewing or listening to media content, observing a lecture or discussion, etc. Additionally, raw sentiment scores may be calculated for groups of users engaged in the same active or passive behaviors, such as groups of users engaged in a discussion, viewing or listening to the same media content, participating in an training session, listening to a talk or lecture, and the like. In some cases, multiple raw sentiment scores may be calculated during a single activity, for example, different raw sentiment scores may calculated for the same user(s) at different times while viewing a television program or movie, playing an interactive game, attending a class lecture, etc. Thus, the raw sentiment score(s) calculated in step 1109, like those calculated in step 802, may correspond to sentiment feedback received from a single user or multiple users, associated with an active or passive feedback activity and/or a specific feedback time.

When calculating a raw sentiment score for an item of content feedback data (e.g., a discussion post, a text, audio, or video message, a reaction to or review of media content or a live talk or lecture, etc.), the raw sentiment score calculator 1060 may use the outputs of one or more multimodal feedback analyzers 1020-1040. If each feedback analyzer 1020-1040 outputs a modal numeric sentiment score, the calculator 1060 may combine (e.g., by weighting and/or averaging) the separate sentiment scores. For example, the text portion of a content feedback data item may indicate relatively positive sentiment from a user, but the corresponding voice and/or video data from the same user may indicate less positive or even negative sentiment, or vice versa, resulting in a relatively neutral combined raw sentiment score in step 1109.

In some embodiments, one or more of the multimodal feedback analyzers 1020-1040 may provide other types of sentiment output rather than numeric sentiment scores. For example, certain types of voice or image/video data (e.g., specific facial expressions, gestures, speaking or writing patterns, etc.) may be indicators of greater positive sentiment and greater negative sentiment. Thus, in such embodiments, the outputs of the audio feedback analyzer 1030 and image/video feedback analyzer 1040 may be computed weights or multipliers that will be applied to the numeric output from the text feedback analyzer 1020, thereby using the audio or video data to amplify or mute the initial positive or negative sentiment score determined from the text feedback. Additionally, in some cases, the separate multimodal feedback analyzers 1020-1040 and/or the raw sentiment score calculator 1060 may resolve ambiguities regarding user sentiment at a particular time using the sentiment data earlier or later than the time for the same user(s). For instance, a user's text, voice, or video feedback data that is ambiguous with respect to sentiment may be determined to be negative or positive sentiment by referencing the user's earlier or later sentiment states.

As discussed above, in some cases a single raw sentiment score(s) may be calculated in step 1109 for a single item of content feedback data (e.g., a discussion post, text, audio, or video message, reaction, review, etc.). However, in other examples, multiple sentiment score(s) may be calculated for a single content feedback data. For example, based on a user's feedback to a training session, class lecture, or media content, the raw sentiment score calculator 1060 may calculate an intellectual sentiment score and a separate emotional sentiment score. In various other examples, any number of different sentiment scores may be calculated for different emotion types. In such embodiments, the multimodal feedback analyzers 1020-1040 may be designed accordingly to analyze and output the same multiple sentiment scores or other corresponding sentiment data.

In some embodiments, a real-time sentiment feedback analyzer may be implemented to receive feedback data from a plurality of related user devices in real time, and then provide real-time aggregated feedback data and/or alerts to presentation devices. As discussed below, various examples of real-time sentiment feedback analyzers may be implemented in connection with CDNs 100 that provide live or real-time content to user devices, such as live streaming broadcasts, live television programming, professional training or eLearning systems, and the like.

Figure 13:
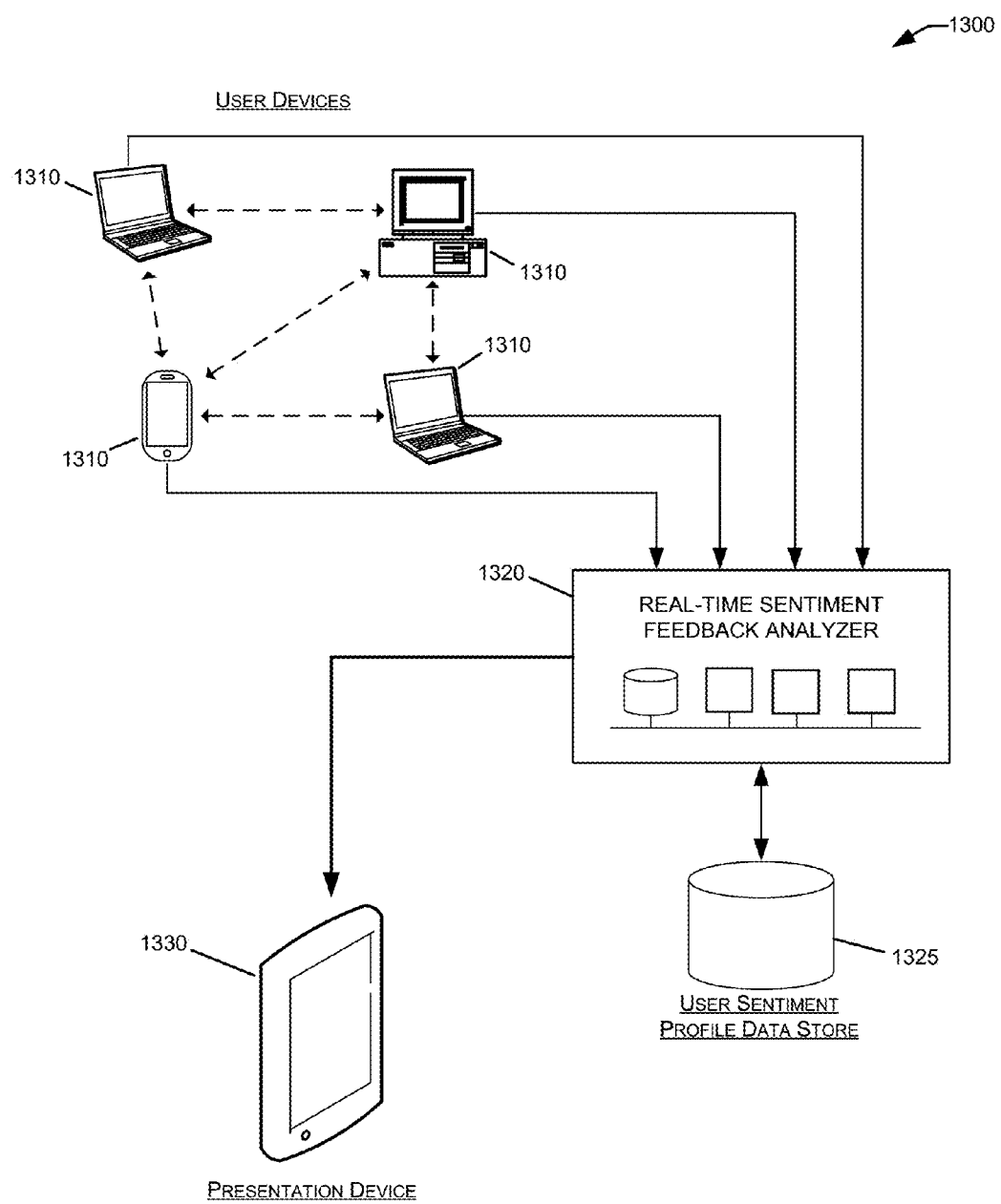
FIG. 13 is a block diagram illustrating an example real-time sentiment feedback system for receiving and analyzing user feedback data and providing feedback to presenters of live content, according to one or more embodiments of the disclosure.

Referring now to FIG. 13, a block diagram is shown illustrating an example of a real-time sentiment feedback system 1300 for receiving and analyzing user feedback data, and providing feedback to presenters of live content in real-time or near real-time. In this example, the real-time sentiment feedback system 1300 includes a plurality of user devices 1310, a real-time sentiment feedback analyzer 1320, a user profile data store 1325, and a presentation device 1330. System 1300 may be integrated within (or configured to operate in collaboration with) one or more content distribution networks 100 and/or sentiment analyzer systems 600, described above. Specific examples of such CDN 100s, may include, without limitation, educational and professional training systems and networks, interactive gaming systems and networks, media distribution systems and networks, and enterprise application systems and networks, and/or social networking/dating systems and networks. As discussed below, each of the components shown in the example real-time sentiment feedback system 1300 may correspond to a single computer device or server, or may be a complex computing system including a combination of computing devices, storage devices, network components, etc. Each of these components and their respective subcomponents may be implemented in hardware, software, or a combination thereof.

User devices 1310 may include desktop or laptop computers, mobile devices, and other various computing devices/systems, including some or all of the hardware, software, and networking components discussed above in connection with client devices 630. In this example, user devices 1310 may be configured to receive and display live content and/or receive feedback data from users related to live content. In some embodiments, live content such as television programming, music, lectures or presentations in a training course or eLearning system, and/or live gaming content may be streamed from one or more content providers in a CDN 100 (e.g., server 640) to user devices 1310. User devices 1310 thus may include the necessary hardware and software components to establish the network interfaces, security and authentication capabilities, and content caching capabilities to receive the live content and provide it to users in real-time (or near real-time).

User devices 1310 also may capture feedback data from users in response to the live content and transmit the captured feedback data to one or more real-time sentiment feedback analyzers 1320. Any of the various feedback capture devices discussed here (e.g., cameras, microphones, keyboards, etc.) may be integrated with and/or peripheral to the user devices 1310, to collect user feedback data corresponding to the live content displayed via the user devices 1310. Additionally, in some embodiments, the live content need not be displayed via user devices 1310, but may originate from a separate device, conference room or classroom projector, a live speaker, etc. In such examples, the user devices 1310 might only capture and transmit feedback data, and therefore user devices 1310 may be special purpose hardware devices such as cameras, microphones, motion detectors, and other sensor devices.

Real-time sentiment feedback analyzer 1320 may include a single computer server or combination of computer servers, storage devices, network components, etc. As discussed below, the real-time sentiment feedback analyzer 1320 may be implemented to receive and analyze real-time feedback data from user devices 1310, and transmitted aggregated feedback data to presentation devices 1330. In order to execute the functions and tasks described herein, real-time sentiment feedback analyzer 1320 may be implemented using any combination of the computer hardware, software, storage, and network components discussed above, such as those in illustrative computer system 500, and also may be implemented within any of the computing environments discussed above, such as content distribution network 100 and/or distributed computing environment 200. For example, real-time sentiment feedback analyzer 1320 may include secure storage device(s) to store content feedback and/or neural networks 660, processors and software execution engines for analyzing and aggregating feedback, and calculating sentiment scores, and network interface components for transmitting sentiment analyzer output to one or more presentation devices 1330. The real-time sentiment feedback analyzer 1320 may be implemented as a separate and independent computing system, or may be integrated as a set of hardware and software components within a user device 1310, presentation device 1330, or other computer system.

In some embodiments, the real-time sentiment feedback analyzer 1320 may access a user sentiment profile data store 1325. User sentiment profile data store 1325 may be implemented as a database, file-based storage or other storage system. Data store 1325 may store user sentiment profiles for a set of users associated with user devices 1310. In some cases, the real-time sentiment feedback system 1300 may be associated with a relatively small and well-defined set of users, such as a set of attendees at a presentation, a set of employees in a professional training course, a set of students in a class, etc. Therefore, the data store 1325 may store previous sentiment feedback data associated with some or all of the associated users, including previous text feedback data, previous voice feedback data, baseline facial expressions and gestures, and the like. The user sentiment profile data store 1325 may be implemented within the real-time sentiment feedback analyzer 1320, or as a separate data storage system which may provide user sentiment profile data to one or more sentiment feedback analyzers.

Presentation device 1330, like user devices 1310, may include desktop or laptop computers, mobile devices, and other various computing devices/systems, including some or all of the hardware, software, and networking components discussed above in connection with client devices 630. As discussed below, presentation devices 1330 may be configured to receive real-time feedback data from sentiment feedback analyzers 1320, including notifications and/or real-time alerts of group sentiment levels, group sentiment changes, group sentiment variance, etc. Presenters of live content (e.g., lecturers, instructors, performer, live television program producers, etc.) may use the real-time or (near real-time) feedback data from the presentation device 1330 to alter and customize the live presentation content.

Real-time sentiment feedback systems such as the example shown in FIG. 13 may be implemented on small or large scales, and in one physical locations or across multiple locations. For example, in some embodiments, a presentation device 1330 may be operated on the same computing and networking infrastructure and in the same physical location as the set of related user devices 1310, for example, within a conference room, theater, lecture hall, or class room. In such cases, the presentation device 1330 may execute the feedback analyzer 1320 as a subcomponent, and communications may occur via LAN, Bluetooth®, M-RFID, and/or other short-range communication infrastructures. In other embodiments, the presentation device 1330 and user devices 1310 may operate at remote geographic locations, such as in an interactive gaming system, remote video conference, or live eLearning system having many geographically diverse user devices 1310 and a presentation device 1330 at a separate location. In such large scale and geographically diverse implementations, different networking communication protocols and security systems may be implemented, such as WAN, cable, or satellite-based communication using specialized networking equipment such as firewalls, load balancers, and the like.

Figure 14:
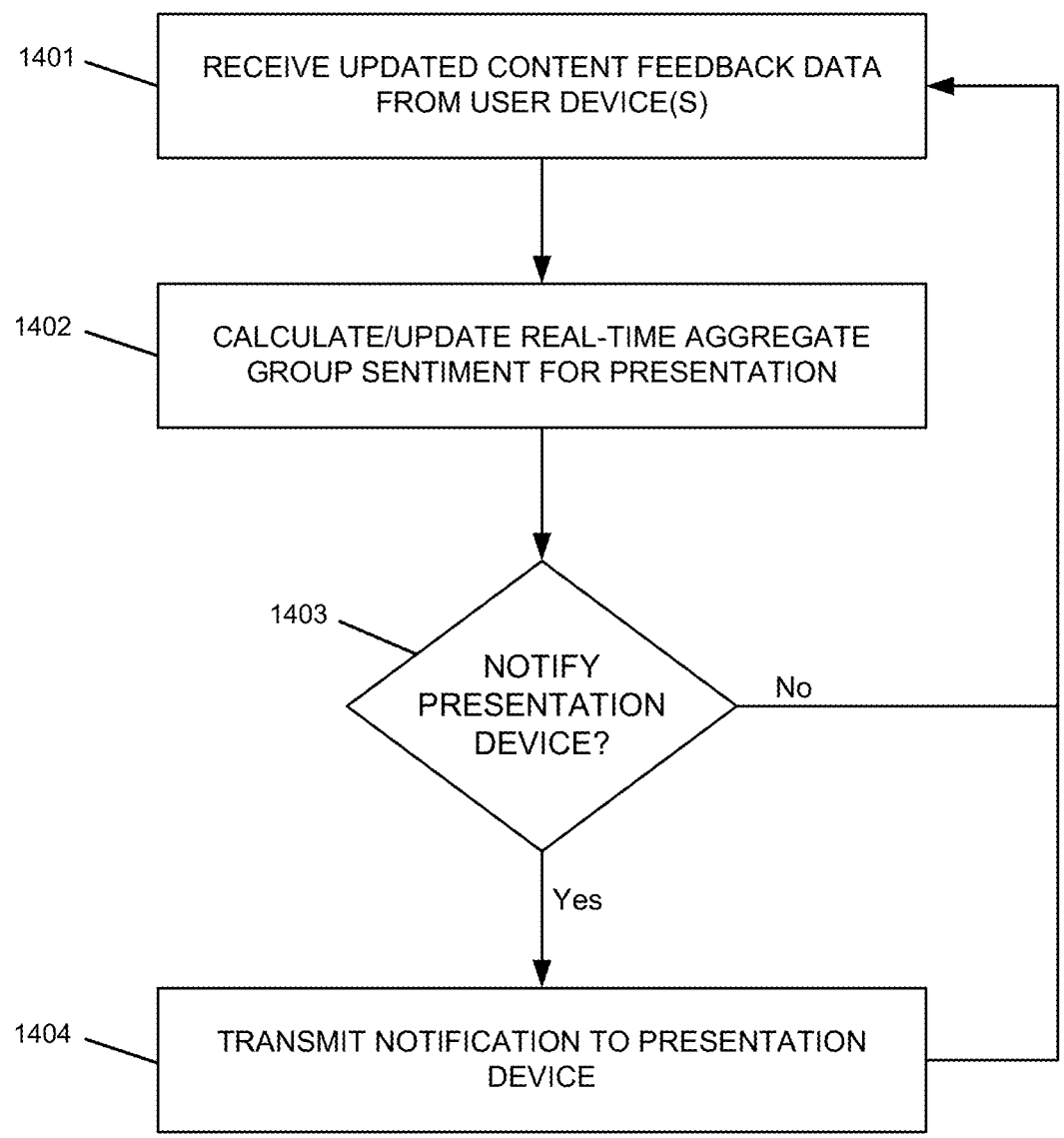
FIG. 14 is a flow diagram illustrating an example process of calculating real-time aggregated group sentiment and providing notifications to a presentation device, according to one or more embodiments of the disclosure.

Referring now to FIG. 14, a flow diagram is shown illustrating a process of calculating real-time aggregated group sentiment for a presentation of live content, and providing notifications to a presentation device based on the real-time group sentiment. The steps in this process may be performed, for example, by a real-time sentiment feedback system 1300 operating within or in collaboration with the various component servers and devices of a sentiment analyzer system 600 or 700. However, it should be understood that the real-time collection and analyses of feedback data, and the calculations of real-time aggregated sentiment described herein need not be limited to the specific systems and hardware implementations described above, but may be performed within other computing environments comprising other combinations of the hardware and software components described herein.

In step 1401, one or more content feedback data is received, for example, by a real-time sentiment feedback analyzer 1320. The feedback data may be transmitted by one or more user devices 1310 associated with the same presentation device 1330. For example, a set of user devices 1310 may be displaying live content, or time synchronized pre-recorded content, received from the presentation device 1330 (e.g., a live presentation, lecture, or television program, a prerecorded lecture or program, live interactive gaming content, etc.). In other examples, the user devices 1310 need not be receiving or displaying any live content, but may be physically located in the same location (e.g., a conference room, lecture hall, class room, etc.) in which users are viewing or interacting with the same content (e.g., a live lecture, a pre-recorded presentation or program, etc.). In either case, the user devices 1310 may capture feedback associated with the same presentation and/or presentation device 1330, and transmit the feedback data in real-time or near real-time to the real-time sentiment feedback analyzer 1320.

The feedback data received in step 1401 may include real-time (or near real-time) text, audio, and/or video feedback. For instance, streaming audio and/or video feedback from microphones (e.g., 912 and 930) and/or cameras (e.g., 911 and 920) may be transmitted to the real-time sentiment feedback analyzer 1320. Additional text feedback may include online discussion posts, chat content, questions and answers, emails, and the like, authored by users at user devices 1310 during a live (or prerecorded) presentation of content. The feedback data may include user-to-user communications between user devices 1310, user-to-presenter communications between a user device 1310 and a presentation device 1330, or other user feedback captured by user devices 1310. Text, audio, and video feedback data may be captured and transmitted, for example, by event-based or streaming systems executing on the user devices 1310. In some cases, the user devices 1310 may timestamp the feedback data to allow time synchronization at the feedback analyzer 1320 and/or other downstream analyzers.

In step 1402, one or more real-time aggregate group sentiment values are calculated based on the feedback data received in step 1401. For example, the real-time sentiment feedback analyzer 1320 may calculate sentiment scores based on the feedback data using any of the various techniques described above (e.g., in reference to FIG. 8 or FIG. 11, etc.). Such techniques may be used to calculate individual sentiment scores associated with specific user devices 1310 and/or aggregated sentiment scores for groups of devices 1310 viewing or interacting with the same content and/or same presentation device 1330. In some cases, an aggregate group sentiment score may be computed as an average of individual feedback sentiment scores. Alternatively or additionally, the aggregate group sentiment values calculated in step 1402 may include feedback sentiment ranges and/or variances between different users and groups of users. The aggregate group sentiment values may be calculated based on the accumulated feedback data received since the beginning of a content presentation, or may correspond to a current or rolling aggregate group sentiment based only on more recent feedback (e.g., feedback data captured within the last 30 seconds, last minute, last five minutes, etc.). Additionally, the aggregate group sentiment values may correspond to an overall group sentiment score or may be calculated as multiple values for separate sentiment aspects or emotional types (e.g., aggregate group intellectual sentiment score, and aggregate group emotional sentiment score, etc.).

In step 1403, the real-time sentiment feedback analyzer 1320 may evaluate the aggregate group sentiment values calculated in step 1402 on an ongoing basis, and may determine whether or not a notification should be provided to one or more presentation devices 1330. In various different embodiments, the real-time sentiment feedback analyzer 1320 may execute several different types of notification/alert rules. For instance, the feedback analyzer 1320 may implement a sentiment threshold rule by transmitting notifications to a presentation device 1330 when the real-time aggregate group sentiment data associated with a specific presentation, presenter, or other live content, falls below a predetermined sentiment threshold value. In other examples, sentiment threshold rules may be implemented based on changes (e.g., recent increases or decreases) in the aggregate group sentiment, or based on sentiment range, variance, or standard deviation of group sentiment (e.g., to detect the level of uniformity or divergence among the group sentiment), and the like.

In some embodiments, one or more of the sentiment threshold rules implemented in step 1403 may be predefined by system administrators and/or preprogrammed into the real-time sentiment feedback analyzer 1320. In other cases, different presentation devices 1330 may register for different types of notifications or alerts, and may define their own sentiment thresholds and other criteria. Additionally, in some examples, real-time aggregate group sentiment data may be provide to the presentation device 1330 in all cases, and the determination in step 1404 need not be performed.

Figure 15:
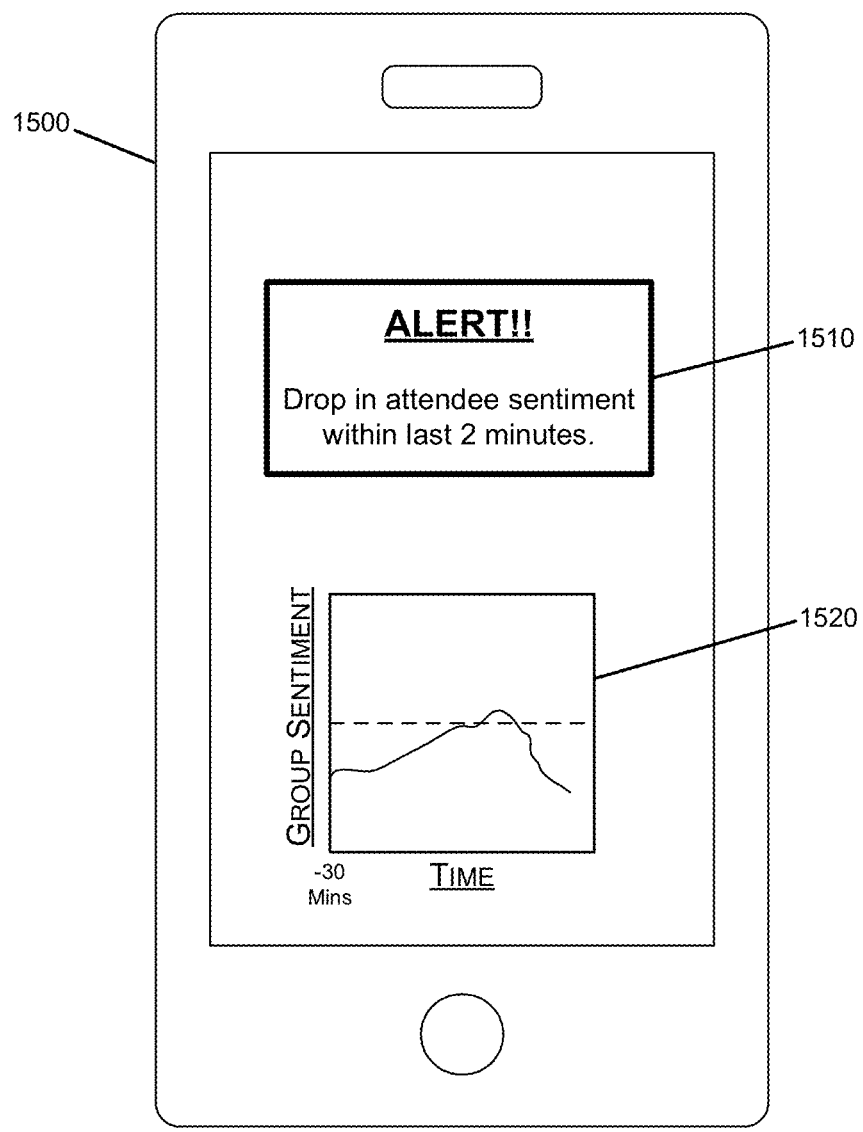
FIG. 15 is an example user interface screen for display on a presentation device, according to one or more embodiments of the disclosure.

If the real-time sentiment feedback analyzer 1320 determines that the aggregate group sentiment data should be provided to the presentation device 1330 (1403:Yes), then the data may be transmitted in step 1404 via a notification, alert, or the like. Referring to FIG. 15, an example user interface screen is shown displayed on a presentation device 1500. In this example, an alert 1510 has been received and displayed on the presentation device 1500 indicated that the aggregate group sentiment of attendees (e.g., users viewing and/or interacting with the same presentation content) has dropped within the last two minutes of the presentation. An additional group sentiment data chart 1520 displays the aggregate group sentiment for the presentation attendees over the last 30 minutes.

Using such notifications/alerts and the corresponding aggregate group sentiment data, a presenter or controller of presentation content may alter or customize a live or prerecorded presentation while the presentation is still underway. For example, a live presenter may respond to a change in audience sentiment by repeating or clarifying material, or by returning to an earlier presentation subject or style that yielded higher audience sentiment. Similarly, if a presenter (e.g., an trainer or instructor) is notified of an increase in the range or variance of viewer sentiment, the presenter may conclude that a subset of the group (e.g., a set of trainees or students) has failed to comprehend or appreciate the material, and the presenter may separate out the subgroup to review the material and attempt to raise the sentiment of the subgroup. Many other responses, both programmatic and manual, may be taken by content presenters in response to various types of aggregate group sentiment data.

As discussed above, in some embodiments, various natural language processing (NLP) engines, such as sentiment neural networks, may be used to calculate sentiment and analyze individual and group sentiment based on received feedback data. Such sentiment neural networks may be trained using content feedback data as input and corresponding sentiment-related results data as output, in order to construct a neural network data structure capable of determining associations between user feedback data and user sentiment with a high degree of accuracy.

Moreover, in some embodiments, context-specific sentiment neural networks may be constructed and trained based on the particular computing architecture and/or functional purpose of one or more content distribution networks 100. For example, specific CDNs 100 and/or specific types of CDN 100 may have unique sets of user sentiments as well as unique indicators of those context-specific sentiments. For instance, while the user sentiment in a generic CDN 100 may range from pleased (e.g., sentiment score of 1.0) to displeased (e.g., sentiment score of −1.0), in an eLearning CDN 100 calculations may be performed for learning-specific sentiments such as confusion, understanding, enthusiasm, confidence, curiosity, and the like. Additionally, the types of user feedback that may indicate positive or negative sentiment in a generic CDN 100 may indicate entirely different sentiments in various context-specific CDNs 100. For instance, user feedback that normally indicates negative sentiment might indicate learning enthusiasm in an eLearning CDN 100, or a high level of engagement and satisfaction in an interactive gaming CDN 100, etc.

Therefore, as discussed below, results-correlated sentiment analyzers may be constructed for specific CDNs 100 and/or types of CDNs 100. For instance, an NLP sentiment neural network for eLearning CDN systems 100 may be constructed and trained using eLearning user feedback and eLearning outcomes as the respective input data and output data for training the eLearning sentiment neural network. Similarly, an NLP sentiment neural network for interactive gaming CDN systems 100 may be constructed and trained using gamer feedback data and gaming outcomes as the respective input and output training data, an NLP sentiment neural network for media content distribution systems 100 may be constructed and trained using media content feedback and media content outcomes as the respective input and output training data, and so on.

Figure 16:
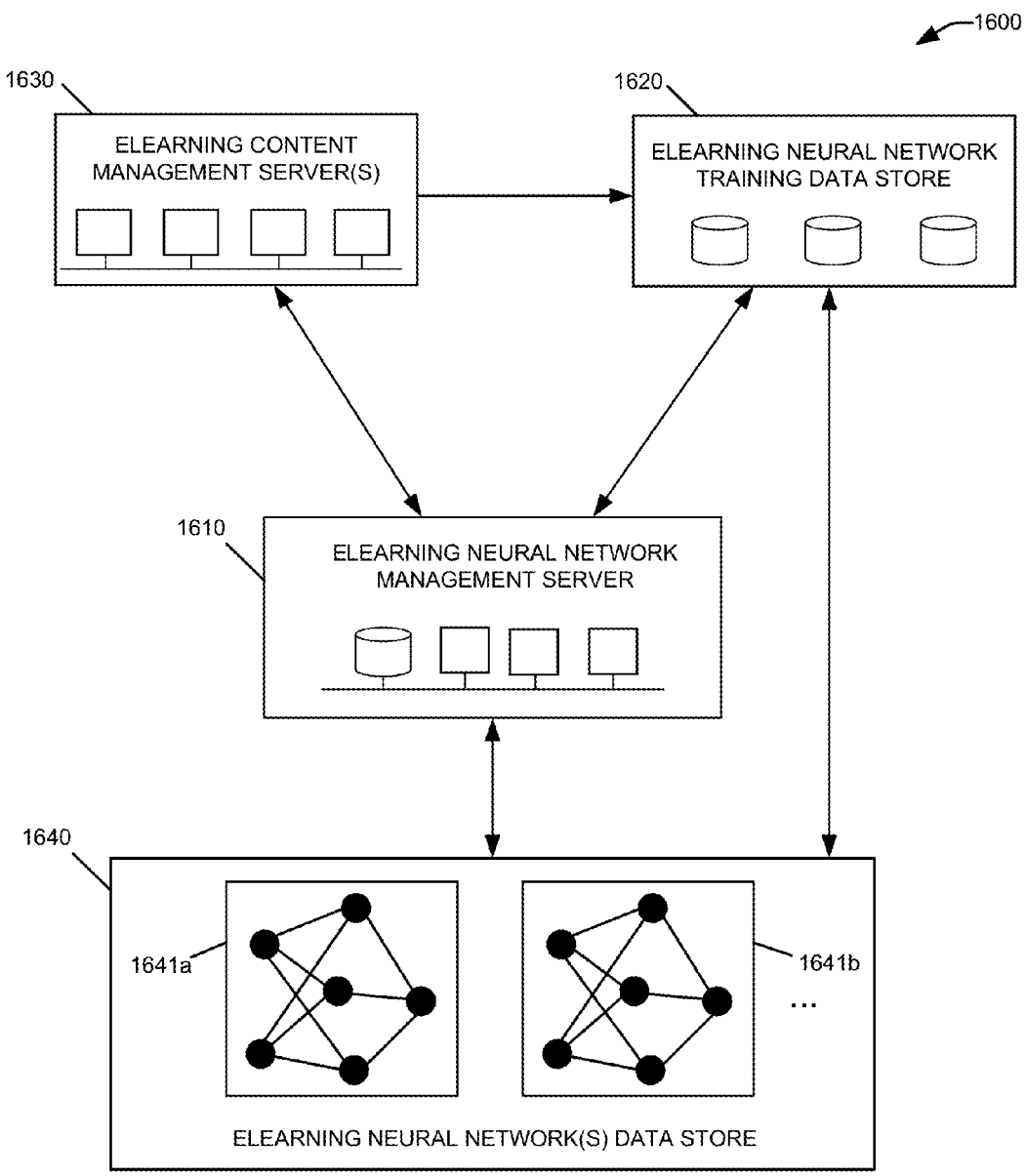
FIG. 16 is a block diagram illustrating an example results-correlated sentiment analyzer system for an eLearning content distribution network, according to one or more embodiments of the disclosure.

Referring now to FIG. 16, a block diagram is shown illustrating an example results-correlated sentiment analyzer system for an eLearning content distribution network (CDN). The system 1600 illustrated in this example may be integrated within an eLearning CDN 100, or may be implemented as a separate system in communication with one or more eLearning CDNs 100 via network interfaces and communication network infrastructures. As discussed below, each of the components shown in the example system of FIG. 16 may correspond to a single computer server or a complex computing system including a combination of computing devices, storage devices, network components, etc. Further, each of these components and their respective subcomponents may be implemented in hardware, software, or a combination thereof.

The example system shown in FIG. 16 relates to the creation, management, and use of neural networks specifically for eLearning CDNs 100. Specific examples of eLearning CDNs 100 and corresponding eLearning neural network systems 1600 may include, without limitation, professional training systems and networks for company employees, online educational systems, web-based training systems, and other technology-enhanced learning systems. In such systems, eLearning end users, such as employees, trainees, students, presentation attendees, and the like, may use various client devices (e.g., 630, 910-930, etc.) to provide feedback in response eLearning content such as live or recorded presentations or lectures, courses, modules, assignments, learning materials, tests and other evaluations, etc.

In some embodiments, eLearning neural network system 1600 may include various components configured to generate and manage a set of artificial neural network data structures used to perform decision-making and/or predictive analyses based on data received from eLearning CDNs 100. As discussed below, such neural network data structures may be designed, constructed, and trained by adaptive learning processes to analyze complex sets of inputs and provide predictive outputs. The specific types of decision-making and predictive analyses performed by an eLearning neural network system 1600 may depend on the context of the eLearning CDN 100 and the data used to train the neural network(s) within the system 1600. For example, eLearning neural network system 1600 may be designed and trained to predict user sentiment within the eLearning CDN 100 based on user feedback to various eLearning content (e.g., responses to presentations, lectures, learning materials, courses, modules, assignments, instructors, etc.). Additionally, in some cases, the eLearning neural network system 1600 also may predict user performance in different courses, classes, modules, tests, etc. eLearning neural network systems 1600 also may be trained to predict user attendance, course or module selection, user sentiment trends, user performance trends, preferences, and other individual or group behaviors within the eLearning CDN 100.

The example system shown in FIG. 16 includes an eLearning neural network management server 1610. As discussed in more detail below, neural network management server 1610 may include various components and subsystems to generate, train, store, deploy, and manage neural networks to be used by eLearning content distribution networks 100. For example, eLearning neural network management server 1610 may receive a request from an eLearning content management server 1630 to perform a predictive analysis or other decision-making process based on eLearning input data provided with the request. In response, the neural eLearning network management server 1610 may use one or more eLearning neural networks 1641 to process the request and return the output (e.g., one or more eLearning user sentiment scores) back to the eLearning content management server 1630. In some cases, the eLearning neural network management server 1610 may store (e.g., in local or attached storage) the neural network structures 1641 used to process requests from CDNs 100. In other cases, the eLearning neural network management server 1610 may route such requests to the appropriate neural network at a remote storage location 1640, such as within a separate storage server or cloud computing architecture, and then return the results to the content management server 1630.

The eLearning neural network management server 1610 may include a single computing server or combination of computer servers, storage devices, network components, etc. eLearning neural network management server 610 may be implemented using any combination of the computer hardware, software, storage, and network components discussed above, such as those in illustrative computer system 500, and also may be implemented within any of the computing environments discussed above, such as content distribution network 100 and/or distributed computing environment 200. For example, eLearning neural network management server 1610 may include secure storage device(s) 1640 to store network network(s) 1641 and/or neural network training data, and processors and software execution engines for accessing the neural networks and executing predictive analyses.

eLearning neural network system 1600 also may include one or more eLearning content management servers 1630. eLearning content management servers may manage and execute processes within CDNs 100 implemented as professional training systems for company employees, online educational systems, web-based training systems, and other technology-enhanced learning systems. In some embodiments, eLearning content management servers 1630 may also collect and provide eLearning neural network training data to eLearning neural network management servers 1610 and/or eLearning data store servers 1620 within the eLearning neural network system 1600. eLearning content management servers 1630 also may access directly or indirectly the neural network structures 1641 within the system 1600 and use the neural networks to perform predictive analyses for their associated CDNs. In order to perform these tasks and others described herein, content management servers 1620 may include a single computing server or combination of computer servers, storage devices, network components, etc. For instance, eLearning content management servers 1630 may correspond to the same content management servers 102 in FIG. 1 and/or FIG. 4, and may include some or all of the same hardware, software, storage and network components described above.

As shown in FIG. 16, eLearning neural network system 1600 may also include one or more eLearning data store servers 1620. eLearning data store servers 1620 may receive and store repositories of eLearning neural network training data. As discussed below, the neural network training data may include corresponding sets of input and output data. The input data used for training an eLearning neural network may include content feedback data received via various user devices, captured via the eLearning CDN 100 using any of the above-described devices and techniques, such as various types of text-based and multimodal user feedback including user-user interactions, user-presenter or student-teacher interactions, and other captured user feedback data. The output data used for training an eLearning neural network may include user data captured via the CDN 100 subsequent to the corresponding input data, such as user results, decisions, or other user-related outcomes. In the context of eLearning CDN systems 100, such output data may include user reviews or evaluations of eLearning content (e.g., assignments, learning material, presentations, presenters or teachers, tests, etc.), along with additional outcome data such as test scores, course grades, attendance records, system usage times and patterns, etc. As discussed below in more detail, the corresponding inputs/outputs of the neural network training data may be used during the training process, involving pattern recognition and adaptive machine learning, to form correlations between inputs and outputs in order to predict user sentiment based on future user feedback data and/or perform other predictive analyses.

The eLearning training data store 1620 may include separate and isolated storage devices and/or logical data stores used for storing the training data associated with different neural network structures 1641. In some embodiments, training data may be received from eLearning neural network management servers 1610 and/or directly from eLearning content management servers 1630. eLearning data store servers 1620 may maintain sets of eLearning training data, and then securely transmit the training data to the eLearning neural network management servers 1610 or an eLearning neural network data store 1640 for training and evaluating eLearning neural networks. In order to perform these tasks and others described herein, eLearning data store servers 1620 may include a single computing server or combination of computer servers, storage devices, network components, etc. For instance, eLearning data store servers 1620 may correspond to the same database servers 104 in FIG. 1 and/or FIG. 3, and may include some or all of the same hardware, software, storage and network components described above.

Neural network system 1600 also may include an eLearning neural network data store 1640 including the set of underlying computing resources for generating and training one or more eLearning neural networks 1641. In various embodiments, eLearning neural networks 1641 may be generated, trained, and evaluated within database servers, cloud computing architectures, and/or other data stores. As discussed below, in some examples a single eLearning neural network 1641 may be generated for a corresponding eLearning CDN system 100. In other examples, multiple eLearning neural networks 1641 may be generated, trained, and deployed to perform predictive analyses of different types or in different situations for an eLearning CDN system 100. Different eLearning neural networks 1641 may be generated corresponding to different subjects, courses, modules, grade levels, and the like, in an eLearning CDN 100. For instance, an eLearning neural network 1641 may be generated and trained to predict sentiment of users in an eLearning technical training course, while another eLearning neural network 1641 may be generated and trained to predict sentiment of users in an eLearning language training course, and so on. As another example, an eLearning neural network 1641 may be generated and trained to predict sentiment of elementary grade/level students users in an eLearning CDN 100, while other eLearning neural networks 1641 may be generated and trained to predict sentiment of different tiers of older students in the CDN 100, and so on.

Figure 17:
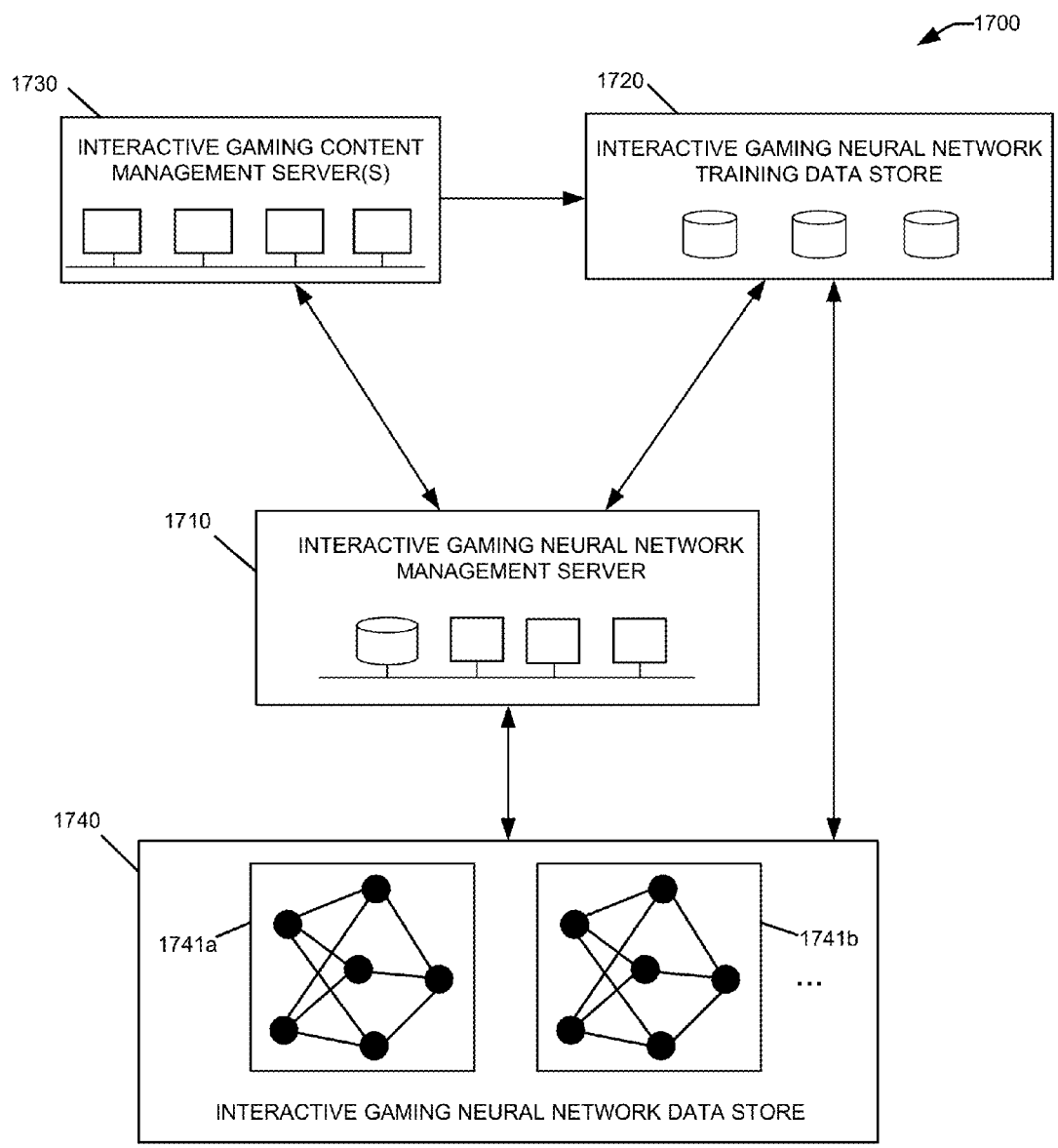
FIG. 17 is a block diagram illustrating an example results-correlated sentiment analyzer system for an interactive gaming content distribution network, according to one or more embodiments of the disclosure.

Although the example system shown in FIG. 16 relates specifically to eLearning neural network systems 1600 and corresponding eLearning CDNs 100, in other examples neural network systems may be implemented for CDNs 100 having different computing architectures and different functional purposes. For example, referring now to FIG. 17, a block diagram is shown illustrating an example results-correlated sentiment analyzer system for an interactive gaming content distribution network (CDN). The interactive gaming neural network system 1700 may be similar in structure and design to the eLearning neural network system 1600, discussed above. For example, interactive gaming neural network system 1700 includes an interactive gaming neural network management server 1710, interactive gaming neural network training data store 1720, interactive gaming content management servers 1730, and an interactive gaming neural network data store 1740 containing one or more interactive gaming neural networks 1741. Each component in FIG. 17 may be designed and implemented in a structurally similar manner to the corresponding component in eLearning neural network system 1600, discussed above. However, the components of the interactive gaming neural network system 1700 may be configured to generate and manage artificial neural network data structures used to perform decision-making and/or predictive analyses based on sentiment feedback data within interactive gaming CDNs 100. Therefore, within the interactive gaming neural network system 1700, the content feedback data captured and used as neural network training data may include various gamer feedback data (e.g., text-based or multimodal gamer feedback, gamer-gamer interactions, game reviews, etc.) captured via various gaming devices within the interactive gaming CDN 100 using any of the above-described devices and techniques. The output data used for training an interactive gaming neural network may include corresponding user data captured via the CDN 100 subsequent to the input data, including gamer sentiment indications such as reviews, results, decisions, or other user-related outcomes. In the context of interactive gaming CDN systems 100, the output data used for training an interactive gaming neural network may include user game reviews and evaluations, game scores, competitive gaming records, game reviews, game playing time and patterns, purchases during gaming sessions, etc.

Figure 18:
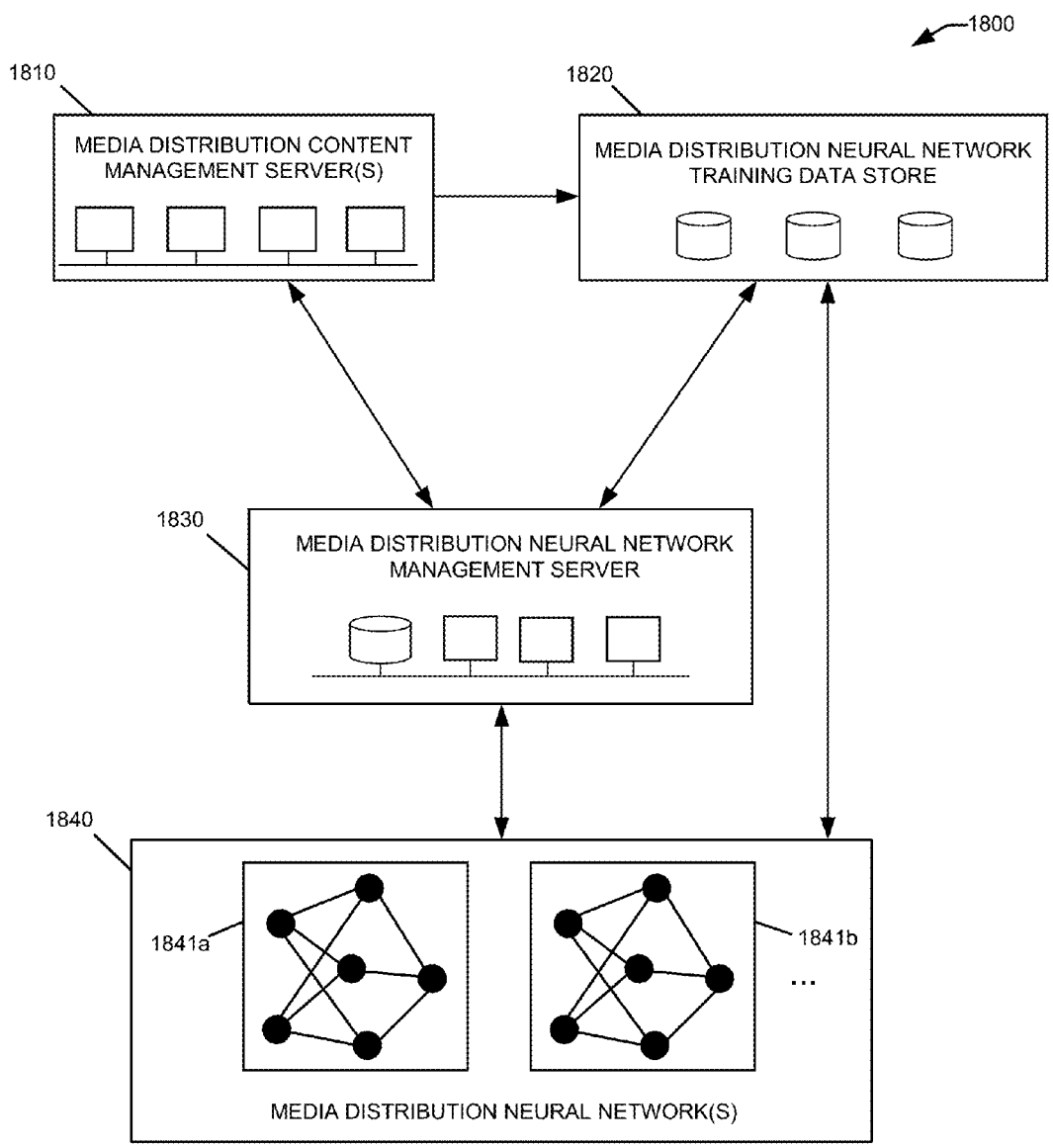
FIG. 18 is a block diagram illustrating an example results-correlated sentiment analyzer system for a media distribution content distribution network, according to one or more embodiments of the disclosure.

Similarly, referring to FIG. 18, a block diagram is shown illustrating an example results-correlated sentiment analyzer system for a media distribution CDN 100. The media distribution neural network system 1800 also may be similar in structure and design to the eLearning neural network system 1600. For example, media distribution neural network system 1800 includes a media distribution neural network management server 1810, media distribution neural network training data store 1820, media distribution content management servers 1830, and a media distribution neural network data store 1840 containing one or more media distribution neural networks 1841. Each component in FIG. 18 may be designed and implemented in a structurally similar manner to the corresponding component in eLearning neural network system 1600, discussed above. However, the components of the media distribution neural network system 1800 may be configured to generate and manage artificial neural network data structures used to perform decision-making and/or predictive analyses based on sentiment feedback data within media distribution CDNs 100. Therefore, within the media distribution neural network system 1800, the content feedback data captured and used as neural network training data may include user feedback data based on media content (e.g., text-based or multimodal media content reactions, reviews, evaluations, etc.) captured via various media consumer devices within the media distribution CDN 100 using any of the above-described devices and techniques. The output data used for training a media distribution neural network may include user data captured via the CDN 100 subsequent to the corresponding input data, including user sentiment indications such as reviews, decisions, or other user-related outcomes. In the context of media distribution CDN systems 100, the output data used for training a media distribution neural network may include user reviews of media content (e.g., music, movies, television programming, etc.), as well as selections, suggestions, purchases, system and network usage times and patterns, etc.

Figure 19:
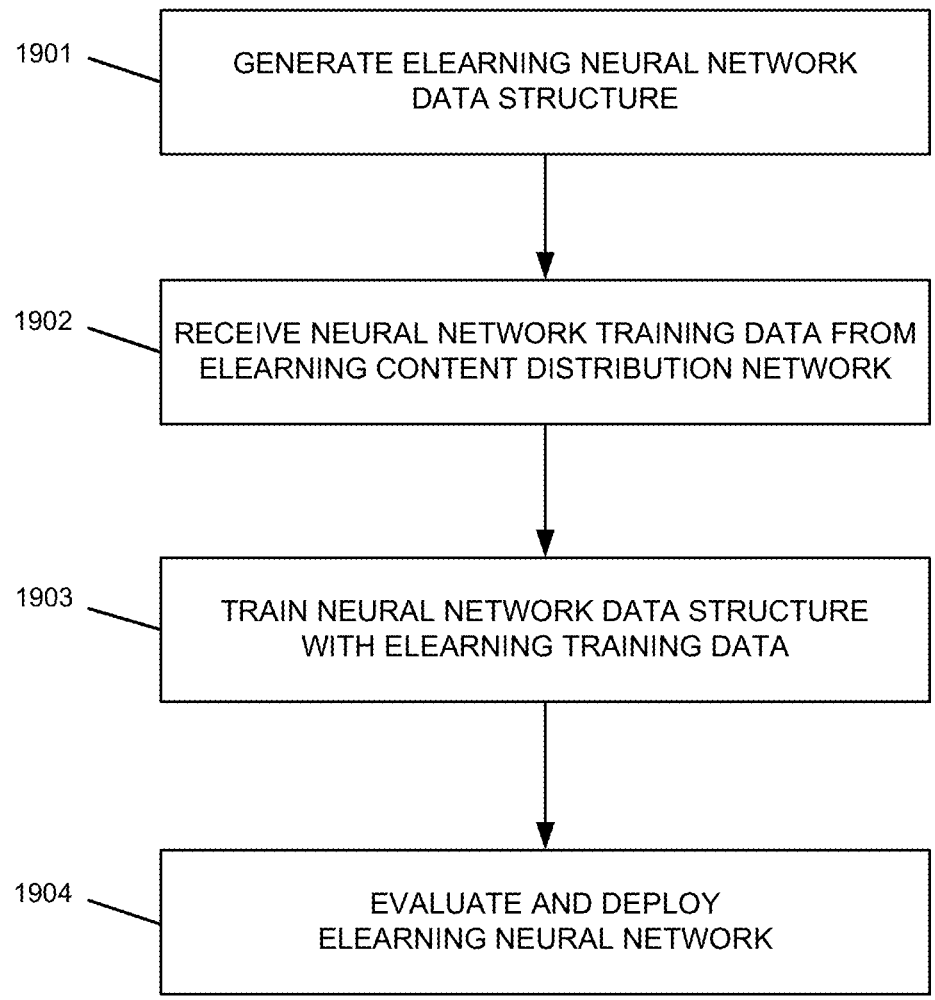
FIG. 19 is a flow diagram illustrating an example process of generating and training an eLearning sentiment neural network, according to one or more embodiments of the disclosure.

Referring now to FIG. 19, a flow diagram is shown illustrating a process of generating and training an eLearning sentiment neural network for use by an eLearning CDN 100. As described below, the steps in this process may be performed by one or more components in the example eLearning neural network system 1600, such as eLearning neural network management servers 1610 and eLearning content management servers 1630. However, it should be understood that the generation, training, and use of eLearning neural network data structures need not be limited to the specific systems and hardware implementations described above, but may be performed within other hardware and system environments comprising other combinations of the hardware and software components described herein.

In step 1901, an eLearning neural network data structure is generated within a neural network computing environment, such as eLearning neural network system 1600. The initial eLearning neural network data structure may be generated at the eLearning neural network management server 1610 or by allocating resources within the eLearning neural network data store 1640 to host the eLearning neural network. In some embodiments, the eLearning neural network data structure may include a plurality of nodes (or neurons), a set of links defining interconnections between different pairs of nodes, and weight values associated with each interconnection. Using the interconnections between nodes, such eLearning neural networks may be structured in layers. For example, an eLearning neural network may include a first layer of one or more input nodes, connected to one or more layers of internal nodes, connected to one or more output nodes. The input node(s) may correspond to input data received from an eLearning CDN 100 relating to a decision-making or predictive analysis problem within the CDN (e.g., user feedback data), and the output node(s) may correspond to the decision or prediction output by the eLearning neural network (e.g., eLearning user sentiment measurements).

For example, in an eLearning CDN 100, neural network inputs may correspond to any user feedback data captured via the CDN 100, including text-based or multimodal feedback from users relating to various eLearning content (e.g., learning materials, assignments, tests, etc.) and/or other eLearning factors (e.g., presenters/teachers, eLearning user devices, presentation media types, etc.). Additional neural network inputs may correspond to various user records within the eLearning CDN 100, such as courses or modules completed by users, scores received for courses, modules, tests, and/or individual questions, user attendance records, times, dates and user patterns for all user interactions with the CDN 100, course or module selections by user, user preferences, trends, and/or any other individual or group behaviors within the eLearning CDN 100. In such examples, one or more neural network outputs may include predictive analyses of learning-specific user sentiments such as confusion, understanding, enthusiasm, confidence, curiosity, and the like, based on the inputs. Additional neural network outputs may correspond to predictions on the performance of individual users of the eLearning system (e.g., employees, participants, trainees, students, etc.), or groups of users for professional training and educational courses or modules, tests, questions, etc. Additional neural network outputs for eLearning CDNs 100, which may be predicted by the same or different neural network structures 1641, may include predictions of user attendance, module or course selection, user trends and preferences, user participation, dropout rates, and other individual or group behaviors within an eLearning CDN 100.

In step 1902, training data for the eLearning neural network is received from one or more associated eLearning CDN 100s. The eLearning neural network training data may be used to train a eLearning neural network, by making adjustments in the weight values of the node interconnections in the eLearning neural network in order to improve and/or optimize the performance of the eLearning neural network in making predictive outputs. eLearning neural network training data may be sets of input and output data records, and may correspond to previously observed and captured user behavior within the eLearning CDN 100, such as the various user feedback data and user actions discussed above. Each record may include a set of one or more inputs and an output corresponding to the "correct" prediction, that is, the observed or desired output associated with the eLearning training data. For instance, an input data record may include set of feedback data (e.g., text feedback, voice feedback, gestures, facial expressions, etc.) captured for an eLearning user, and the corresponding output data record may include the user's eLearning sentiment(s) (e.g., high levels of confusion, frustration, etc.) as reported subsequently by the user in a class or instructor evaluation, test scores, or the like. In contrast, another input data record may include set of feedback data captured for a different eLearning user (or the same eLearning user in a different course, or for different learning material, etc.), and the corresponding output data record may include the user's eLearning sentiment(s) as reported by the user subsequent to the captured feedback data (e.g., high comprehension and engagement, etc.).

In step 1903, the eLearning neural network generated in step 1901 is trained using the training data received in step 1902. During the training process, the eLearning training data may be iteratively run through the eLearning neural network data structure. Within each iteration, the input values of one or more training data records may be fed to the input nodes of the eLearning neural network, and the resulting neural network output may be compared to the "correct" output from the corresponding eLearning training data record. Before the first iteration, the interconnection weight values of the eLearning neural network data structure may be randomly assigned. The eLearning training process may be an iterative learning process during which a neural network algorithm, such as a back propagation algorithm, is used continuously adjust the interconnection weight values of the neural network data structure in order to improve the overall results of the eLearning neural network in predicting the outputs of the training data.

In step 1904, after the eLearning neural network data structure has been trained based on the eLearning training data, the neural network may be evaluated and then stored and/or deployed for use by one or more eLearning CDNs 100. In some embodiments, the evaluation of the eLearning neural network may use evaluation data records similar to the eLearning training data records used in step 1903. For example, a random set of eLearning neural network training data records may be excluded from the training data used in step 1903 and designated as evaluation data. The evaluation data may be run through the trained eLearning neural network, by providing evaluation record inputs to the input nodes, and then comparing the neural network outputs to the corresponding evaluation record outputs. If a sufficient number of eLearning training data records were used, and if the training data records are representative of the evaluation records (and presumably also representative of the current user interactions occurring within the CDN 100), then the eLearning neural network will likely accurately predict the outputs of the evaluation data within an acceptable error threshold. If the trained eLearning neural network does not accurately predict the evaluation record outputs within an acceptable error threshold, this may indicate that an insufficient amount of training data was used, or that the training data and/or the evaluation data was statistically anomalous and not representative of typical user interactions within the eLearning CDN 100. In such cases, the eLearning neural network data structure may be returned for further training with additional and/or alternative training data.

If the trained eLearning neural network accurately predicts the evaluation record outputs within an acceptable error threshold, then the neural network may be deployed within the eLearning neural network system 1600 and/or eLearning CDN 100. For example, the eLearning neural network 1641 may be stored on a neural network data store 1640 or an eLearning neural network management server 1610. As discussed below reference to FIG. 20, the eLearning neural network(s) 1641 may be accessed by various components of an eLearning CDN 100 to provide eLearning predictive analyses and decision making outputs based on user interactions and other input data from the eLearning CDN 100.

Figure 20:
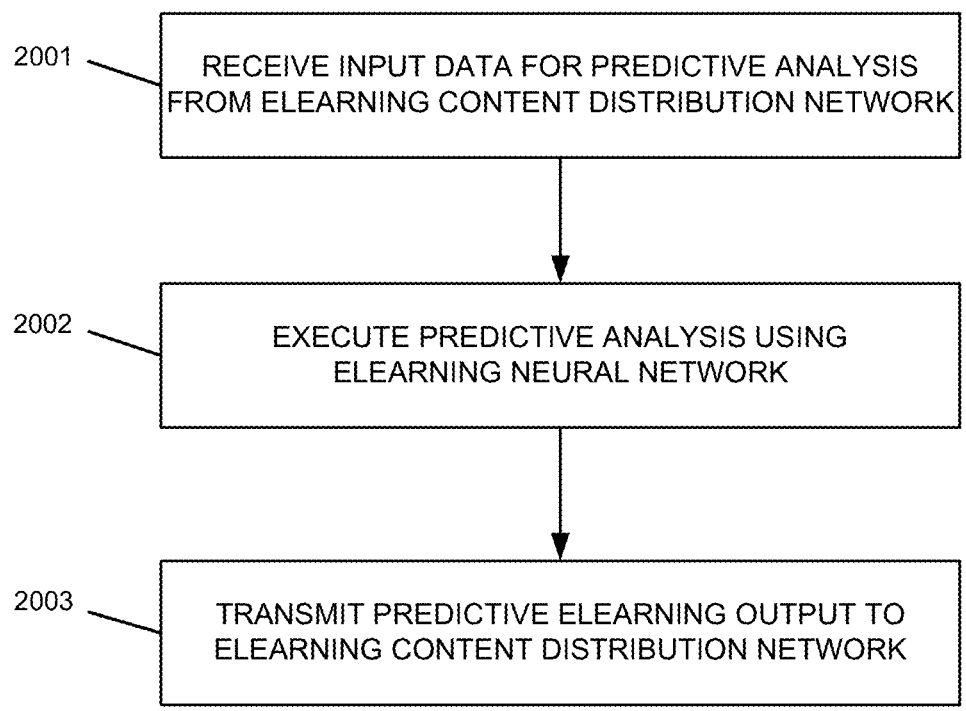
FIG. 20 is a flow diagram illustrating an example process of accessing a trained eLearning sentiment neural network to perform a sentiment prediction or generate another decision-making output, according to one or more embodiments of the disclosure.

Referring now to FIG. 20, a flow diagram is shown illustrating a process of accessing a trained eLearning sentiment neural network to perform a sentiment prediction or generate another decision-making output for an eLearning CDN 100. As described below, the steps in this process may be performed by one or more components in the example eLearning neural network system 1600, such as eLearning neural network management servers 1610, eLearning training data stores 1620, and/or eLearning content management servers 1630. However, it should be understood that the execution of predictive analysis and decision-making processes using eLearning neural networks need not be limited to the specific systems and hardware implementations described above in FIG. 16, but may be performed within other hardware and system environments comprising other combinations of the hardware and software components described herein.

In step 2001, input data is received from an eLearning CDN 100 to be used for a sentiment prediction or other predictive analysis or decision-making process performed by an eLearning neural network 1641. For example, eLearning neural network management server 1610 may receive a request from an eLearning content management server 1630 to perform a user sentiment prediction based on user feedback data collected via the CDN 100. In some embodiments, the input data may include additional eLearning user data (e.g., previous user reviews and evaluations, test scores, attendance records, system usage records, etc.), and/or may be received from multiple different data sources. For example, an eLearning content management server 1630 may transmit a sentiment prediction request including user feedback collected in CDN 100. After receiving the request, the eLearning neural network management server 1610 may retrieve additional input data relating to the sentiment prediction request from the CDN 100 and/or from other external computer servers. Such additional input data may include, for example, demographic data, financial data, educational or occupational data, social network data, etc., relating to the user about which the sentiment prediction request (or other predictive analysis) was requested.

As discussed above, the input data received in step 2001 may depend on the computing architecture and/or functional design of the CDN 100, as well as the type of analysis or decision-making processing desired. For example, in an eLearning CDN 100 used for professional training, presentations, online educational courses, etc., the input data received in step 2001 may include user feedback data and/or other user records of a trainee or student user of the eLearning CDN 100, such as courses or modules completed, scores received on courses, modules, or tests, responses to specific questions, user attendance records, relevant times of dates of all user actions, course or module selections by trainees or students, user preferences, trends, and/or any other individual or group behaviors captured by the CDN 100. For a CDN 100 used to provide on-demand media content to users, the input data received in step 2001 may include user feedback data relating to various media content titles, as well as additional user demographic data, previous user selections of media titles, previous usage times and media consumption patterns, and previous user ratings of media content, etc. For an interactive gaming CDN 100, the inputs received in step 2001 may include user feedback data relating to various games, game levels, and players, as well as additional user data such as previous gaming selections, scores, and performance, previous gaming times and usage patterns, and user rating or feedback regarding previous interactions with games, modules, levels, and other users.

In step 2002, the eLearning neural network management server 1610 may access a neural network 1641 to execute the sentiment prediction (or other predictive analysis or other decision-making process) using the user feedback data (or other input data) received in step 2001. In some embodiments, different types requested predictive analysis may have different associated neural networks 1641. For example, eLearning neural network 1641a may be used to predict sentiment of users in one eLearning program, class, grade level, subject, etc., while eLearning neural network 1641b may be used to predict sentiment of users in other eLearning programs, classes, grade levels, subjects, etc., and so on. Therefore, in step 2002, the eLearning neural network management server 1610 may determine and provide the input data to the appropriate neural network 1641, and then receive and store the output(s) from the neural network 1641. In step 2003, the output received from the eLearning neural network 1641 may be provided back to the eLearning content management server 1630, or any other device that initiated the request in step 2001.

As discussed above, the neural network outputs generated in step 2002, and provided back to the CDN 100 in step 2003, may depend on the architecture and/or the functional design of the CDN 100, as well as the type of predictive analysis or decision-making processing desired. In this example, eLearning neural network outputs for professional training and educational CDNs 100 may include learning-specific user sentiment measurements based on user feedback captured via the eLearning CDN 100. In other examples, additional eLearning neural network outputs may correspond to predictions regarding user performance for specific courses, modules, or tests, user selections of courses or modules, user participation behaviors, user dropout probabilities, and the like. Neural network outputs for interactive gaming CDNs 100 may include gaming-specific user sentiment measurements based on user feedback captured via the interactive gaming CDN 100. In other examples, additional outputs from interactive gaming neural networks 1741 may include predictions of gamer selections of games, modules, levels, scores, multi-player teams, competitors, etc., and predictions of future usage patterns and behaviors for individuals and groups of gamers. Neural network outputs for media distribution CDNs 100 may include, for example, media consumer sentiment measurements based on user feedback captured via the media content distribution CDN 100. In other examples, additional outputs from media distribution neural networks 1841 may include predictions of user selections or user suggestions for music, movies, and television content, and predictions of future usage patterns and behaviors for individual users (e.g., usage times and days, data usage amounts, etc.).

In the above examples and other implementations of neural network systems 1600-1800 and corresponding CDNs 100, the neural network output received in step 2003 may be used as user sentiment measurements such as those discussed above in step 802. By implementing and deploying context-specific sentiment neural networks (e.g., eLearning sentiment neural networks, interactive gaming sentiment neural networks, etc.), the sentiment analyzers systems described above may be context-specific analyzers capable of analyzing and calculating various context-specific sentiments and sentiment levels.

Figure 21:
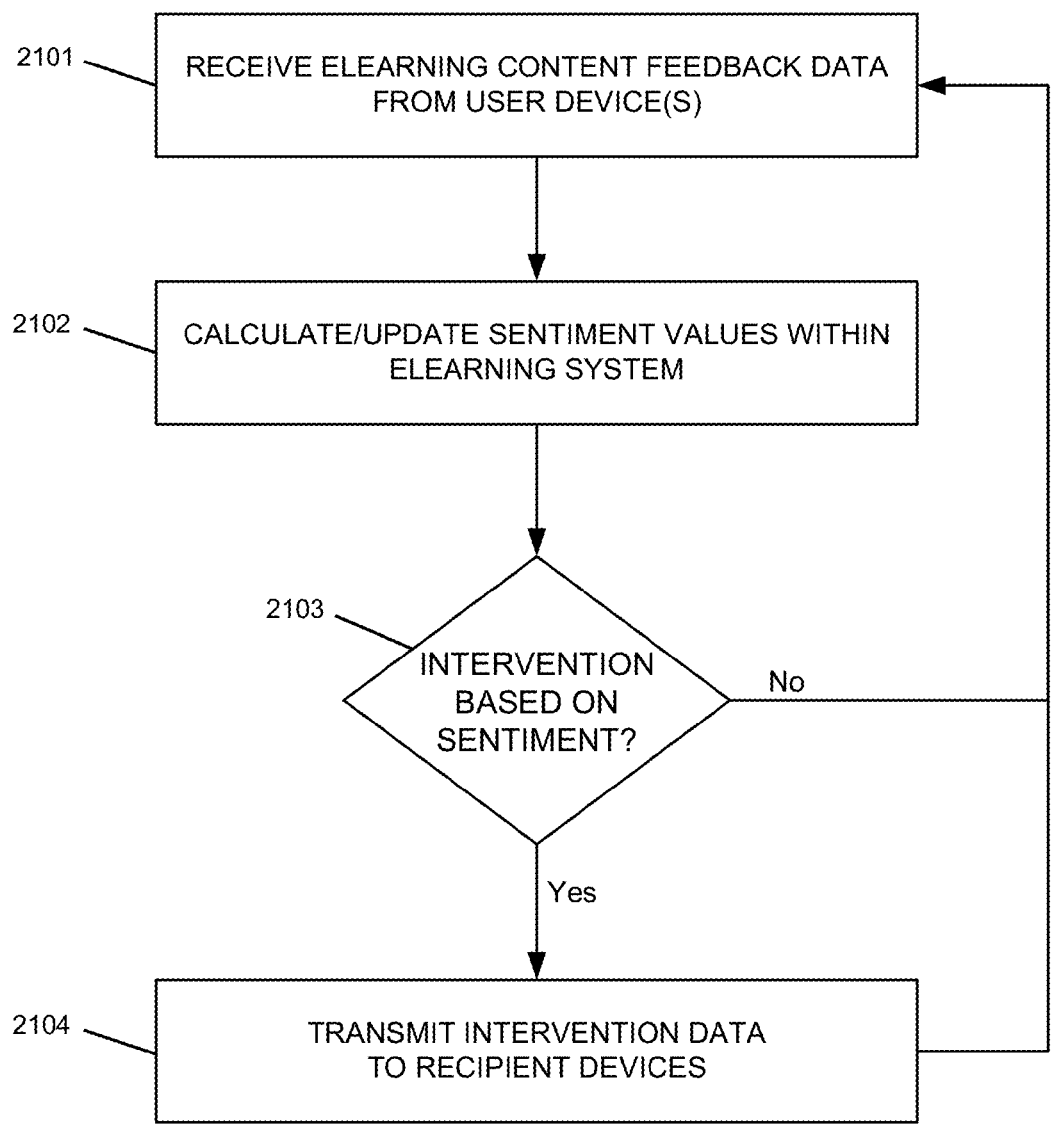
FIG. 21 is a flow diagram illustrating an example process of calculating sentiment values based on feedback data and performing sentiment-based interferences, according to one or more embodiments of the disclosure.
Figure 22A:
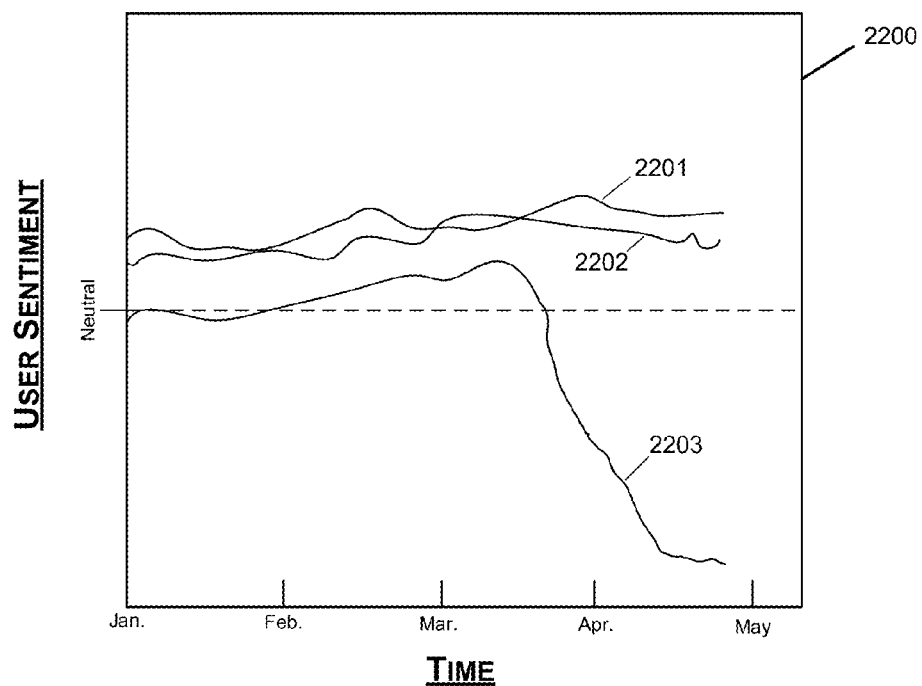
FIGS. 22A and 22B are example graphs illustrating separate sentiment calculations over a time period, according to one or more embodiments of the disclosure.
Figure 22B:
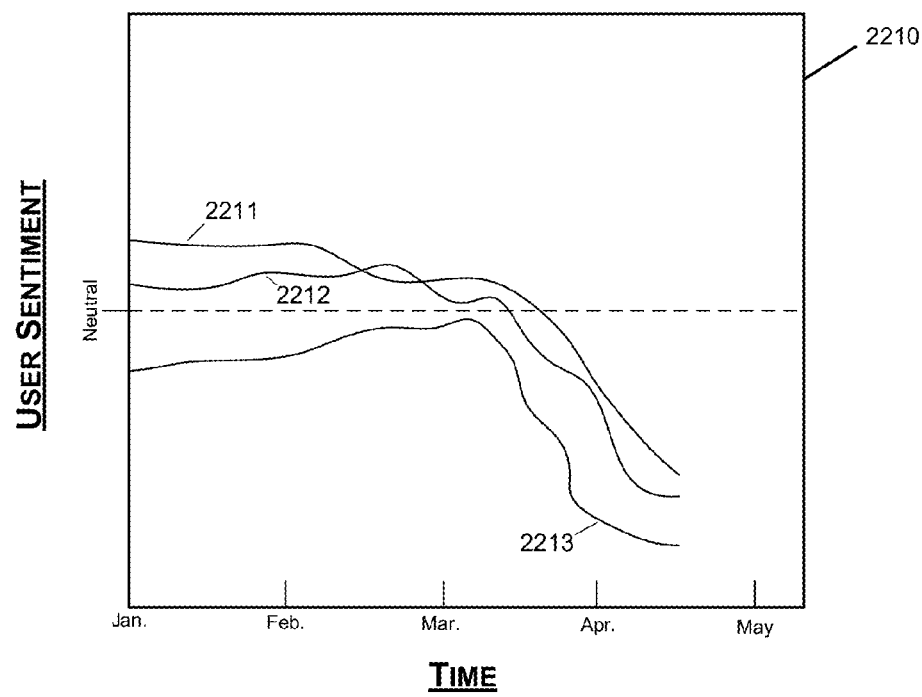

Referring to FIGS. 21 and 22A-B, in some embodiments, the various sentiment analyzer systems and/or content distribution networks described herein may be implemented as sentiment interference systems in which multiple sentiment measurements are analyzed to determine if and when an interference (or intervention) may be triggered. For example, within one or more of the sentiment analyzer systems discussed herein (e.g., systems 600, 700 1000, 1600, etc.), a set of sentiment calculations may be collected and tracked over time, sentiment trends and variances may be calculated for one or more users, and interference determinations may be performed based on the various sentiment calculations. In some cases, sentiment-based interference determinations may be performed in context-specific sentiment analyzer systems and CDNs, such as an eLearning sentiment analyzer system and eLearning CDN. In an eLearning sentiment analyzer system, eLearning system feedback data may be analyzed for individual users (e.g., employees, trainees, students, program participants, etc.) or groups of users, sentiment calculations may be performed for the users or groups, and determinations may be made regarding potential interferences (e.g., user notifications, intervention recommendations, etc.) based on the sentiment calculations of the eLearning sentiment analyzer system. Similar sentiment-based interference determinations may be performed in other types of context-specific sentiment analyzer systems, such as interactive gaming sentiment analyzer systems, media distribution sentiment analyzer systems, eCommerce sentiment analyzer system, etc.

Sentiment interference systems may be designed and implemented with various hardware, software, and network components similarly or identical to one or more of the sentiment analyzer systems discussed above. For instance, a sentiment interference system may correspond to the example sentiment analyzer system 600 discussed above, including one or more content provider servers 640, user devices 630, feedback data stores 620, feedback analytics servers 610, and various other content distribution and sentiment feedback analyzer components. Such sentiment interference systems also may be integrated within (or configured to operate in collaboration with) a content distribution network 100, such as an eLearning CDN 100 implemented as a professional training system for company employees, an online educational system, a web-based training system, or other technology-enhanced learning system. Each component of the sentiment interference systems described herein may correspond to a single computer server or a complex computing system and may be implemented using any combination of the computer hardware, software, storage, and network components discussed above. For example, specialized computing devices within sentiment interference systems may include secure storage device(s) to store content feedback data neural network training data and/or neural networks (e.g., context-specific eLearning training data and eLearning neural networks), processors and software execution engines for analyzing content feedback and performing sentiment calculations and interference determinations, and network components for transmitting interference data (e.g., user notification, intervention recommendations, etc.) to one or more output devices.

Referring now to FIG. 21, a flow diagram is shown illustrating a process of calculating sentiment values based on feedback data and performing sentiment-based interferences (or interventions) in an eLearning system. The steps in this process may be performed, for example, by the components of one or more sentiment analyzer systems discussed herein (e.g., systems 600, 700 1000, 1600, etc.). However, it should be understood that the collection and analyses of feedback data, the calculations of individual and group sentiment, and the determinations and transmissions of sentiment-based interventions described herein need not be limited to the specific systems and hardware implementations described above, but may be performed within other computing environments comprising other combinations of the hardware and software components described herein.

In step 2101, one or more content feedback data is received, for example, by a sentiment analytics server 610, or other device within a sentiment analyzer system 600 or other systems discussed herein. In this example, the received data may relate to one or more eLearning CDNs 100, and may include feedback data such as user discussion posts, online chat, or emails regarding a presentation, lecture, or course, reviews of presenters, instructors, and learning materials, and any other text-based feedback data or multimodal feedback data (e.g., voice, image, or video data) discussed above. In various examples, the eLearning content feedback data received in step 2101 may relate to a single user (e.g., employee, student, trainee, etc.) or a group of associated users enrolled in the eLearning courses/modules, viewing the same presentation, etc. The feedback data may be transmitted by user devices 630 within the eLearning CDN 100, other feedback capture devices such as cameras and microphones, and/or may be received from a feedback data store 620 or other external data store.

In step 2102, one or more individual or group sentiment values are calculated based on the eLearning feedback data received in step 2101. Sentiment values calculations may be performed using one or more techniques described above (e.g., in reference to FIG. 8), including using one or more NLP neural networks to determine raw sentiment measurements for individual feedback data, and/or calculating user or group sentiment scores based on sets of multiple feedback data. In some embodiments, the sentiment values calculated in step 2102 may be aggregated sentiment values corresponding to time window(s) for an individual user or group of users. For instance, a user's current sentiment may be calculated as a rolling average based on the user's individual feedback data over a recent time window, such as feedback data captured within the last N minutes, hours, days, weeks, or months. Such calculations may include multiple types of user feedback data and/or feedback collected via multiple user devices 630, and may serve as a calculation of the user's current overall sentiment with respect to the eLearning CDN 100. The sentiment values calculated in step 2102 also may include current sentiment values, averages, ranges and/or variances for different eLearning content and other aspects of the eLearning CDN 100 (e.g., user sentiment by courses, modules, learning materials, assignments, instructors, user devices, etc.).

The various user sentiment data calculated in step 2102 may be stored, for example, in a sentiment analytics server 610, or other device within a sentiment analyzer system 600 or other systems discussed herein. As discussed below, the sentiment data calculations may be collected and evaluated on an ongoing basis for eLearning system users and groups to make interference determinations based on current user sentiment calculations and various sentiment patterns and trends.

In step 2103, one or more interference determinations may be performed as to whether one or more interferences (or interventions) should be executed based on the sentiment data within the eLearning system. Such interferences may include automatic determinations by the sentiment analytics server 610, or other device within a sentiment analyzer system 600 or other systems discussed herein, to execute one or more functions or transmit one or more notifications via the sentiment analyzer system 600. As discussed below, the sentiment analytics server 610 may compile and analyze user performance data and user sentiment data within the eLearning system for potential intervention recommendations and/or user notifications. The interference determinations in step 2103 may be based on the sentiment calculations performed in step 2102, along within previously stored sentiment data and calculations for the users within the eLearning system, from which user sentiment trends and patterns may be determined.

In some cases, interference determinations performed in step 2103 may include comparing one or more user sentiment values to sentiment thresholds. For example, if a calculation of a user's current sentiment (e.g., the user's rolling sentiment average based on recently captured feedback) falls below a numeric sentiment threshold, then an interference may be performed (2103:Yes). In other examples, an interference may be triggered if a user's current sentiment stays below a sentiment threshold for a predetermined period of time. In some cases, multiple sentiment thresholds may be implemented, for example, a first sentiment threshold that triggers a first type of interference (e.g., a courtesy notification with user information transmitted to the user's device 630), and a second lower sentiment threshold that triggers a second type of interference (e.g., a user intervention recommendation transmitted to an administrator device 630).

Additionally, determinations in step 2103 may be based on trends or patterns of user sentiment, rather than based on a sentiment level threshold. For example, by comparing previously stored user sentiment data to more recent user sentiment calculations, the sentiment analytics server 610 may identify positive or negative trends or recent changes in a user sentiment within the eLearning system. In such examples, an interference may be triggered (2103:Yes) if a user's sentiment calculation changes by more than a predetermined amount over a time window. For instance, if a user's sentiment drops by more than 20% between one course term and the next (or between the beginning and end of a single course term), then an interference may be triggered to notify one or more users, presenters/instructors, administrators, etc.

In some embodiments, the sentiment calculations performed in step 2102 may include multiple different sentiment calculations for one or more users, corresponding to different eLearning content and/or other aspects of the eLearning CDN 100. For example, a rolling average of user sentiment may be computed for a single user, or for a group of users, with regard to a set of different eLearning courses or modules, learning materials, presenters or instructors, user devices, and the like. Referring now to FIGS. 22A and 22B, two example graphs are shown illustrating multiple sentiment calculations for the same user(s) over the same time period. In FIG. 22A, graph 2200 shows three separate sentiment calculations 2201-2203 tracked during a time period between January and May. Similarly, FIG. 22B shows a graph 2210 including sentiment calculations 2211-2213 between January and May. In these examples, sentiment calculations 2201-2203 and 2211-2213 may represent user sentiment for three different courses taken concurrently by the user via an eLearning system. In FIG. 22A, user sentiment for courses 2201 and 2202 is relatively high and consistent throughout the course term, while user sentiment for course 2203 drops significantly starting in mid-March. This may indicate that the user's overall sentiment regarding the eLearning program remains high, but that the user is having difficulties with the course material, instructor, or some other aspect of course 2203. In this case, the interference determination in step 2103 may include a notification to the user with additional learning materials, studying recommendation, and/or tutoring options for course 2203. An interference determination in step 2103 also may include a notification to an instructor, presenter, or other individuals associated with course 2203, to notify the individuals of the rapid drop in the user's sentiment. In contrast, in FIG. 22B, user sentiment for all three courses 2211-2213 drops beginning in March. Accordingly, the interference determination in step 2103 may be different in this case. Rather than an interference directed toward improving user performance or sentiment in a single class, the interference in this case may be directed to a counseling office or administrative office of the eLearning system, indicating that the user's program-wide sentiment has recently fallen and that the user may be at risk for failing multiple courses or dropping out of the program.

As noted above, the different sentiment calculations 2201-2203 in FIG. 22A and 2211-2213 in FIG. 22B may correspond to a user's sentiment calculations for three different courses in an eLearning system. However, in other examples, the different sentiment calculations 2201-2203 and 2211-2213 may correspond to different subjects or categories of eLearning material (e.g., an employee's sentiment regarding technical training courses, language training courses, human resources training courses, etc.), or different types of eLearning material (e.g., a user's sentiment regarding individual reading assignments, individual writing assignments, group presentation assignments, etc.). Additionally, the different sentiment calculations 2201-2203 and 2211-2213 may correspond to different content presenters (e.g., a user's sentiment associated with different presenters/instructors in the eLearning program), or different user devices 630 used to receive and view the eLearning content (e.g., a user's sentiment when interacting with the eLearning system via a mobile phone, a tablet, a desktop computer, etc.). In all of these examples, the interference determinations in step 2103 may be determined based on the overall user sentiment as well as the various separate sentiment calculations within the eLearning system.

In additional embodiments, interference determinations in step 2103 may be based on the user sentiment calculations in step 2102 (including current and past user sentiment calculations), as well as various user performance data within the eLearning system. For example, a drop in user sentiment (e.g., program-wide or for a particular course) that occurs near a poor performance by the user on a test or other evaluation may trigger a notification or intervention for the user, whereas either the drop in sentiment or the poor performance alone would be insufficient to trigger the same action. In other cases, interference determinations may be based on sentiment calculations as well as the differences between observed user performance or activity within the eLearning system (e.g., examination scores, course grades, system access times and usage patterns, etc.) and prior predictions of the user's performance. Such prior predictions of user performance, such as predictions of a user's examination scores, course grades, system access or usage patterns, may be determined by an eLearning neural network or other predictive analysis process. However, still other interference determinations in step 2103 need not be based on any performance data within the eLearning system, but instead may be based solely on sentiment calculations and may be used as early predictors of user performance.

As discussed above, certain interference determinations in step 2103 may correspond to notifications of user sentiment and/or recommendations for user interventions by eLearning system presenters, instructors, administrators, and other users. Such user notifications and intervention recommendations may be negative (e.g., warnings of low user sentiments for comprehension or engagement, recommendations for additional learning materials and/or tutoring, etc.) or positive (e.g., indicators of high user sentiments for eLearning sentiments, recommendations for different or advanced courses, recommendations for specific instructors, etc.). Additionally, some interferences determined in step 2103 may not be conclusive enough to provide user notifications or recommendations, but may instead correspond to functions that flag and collect user sentiment data and other related eLearning data for subsequent analysis. In such cases, various user sentiment data and related data may be analyzed by the sentiment analytics server 610 and/or transmitted to various user devices 630 for further analysis.

In step 2104, data corresponding to the interferences determined in step 2103, such as recent user sentiment and performance for a recommended user intervention within the eLearning system, may be compiled and transmitted to one or more recipient devices. As discussed above, such transmissions may correspond to user notifications, user intervention recommendations, or compilations of user data flagged by the eLearning system for further analysis. The collection and transmissions of the data in step 2104 may be performed sentiment analytics server 610, or other device containing network and security components within a sentiment analyzer system 600 or other systems discussed herein.

Different types of sentiment-based interferences in eLearning systems may result in data transmissions in step 2104 to different user devices 630. In some examples, an interference determined in step 2103 may include a user notification sent to the personal devices 630 of the user (e.g., employee, student, trainee, etc.). In other cases, a recommendation for a user intervention based on recent user sentiment data, user performance data, system usage data, etc., may be transmitted to a presenter device 630, an administrator device 630, or other client devices 630 associated with the eLearning system.

Figure 23:
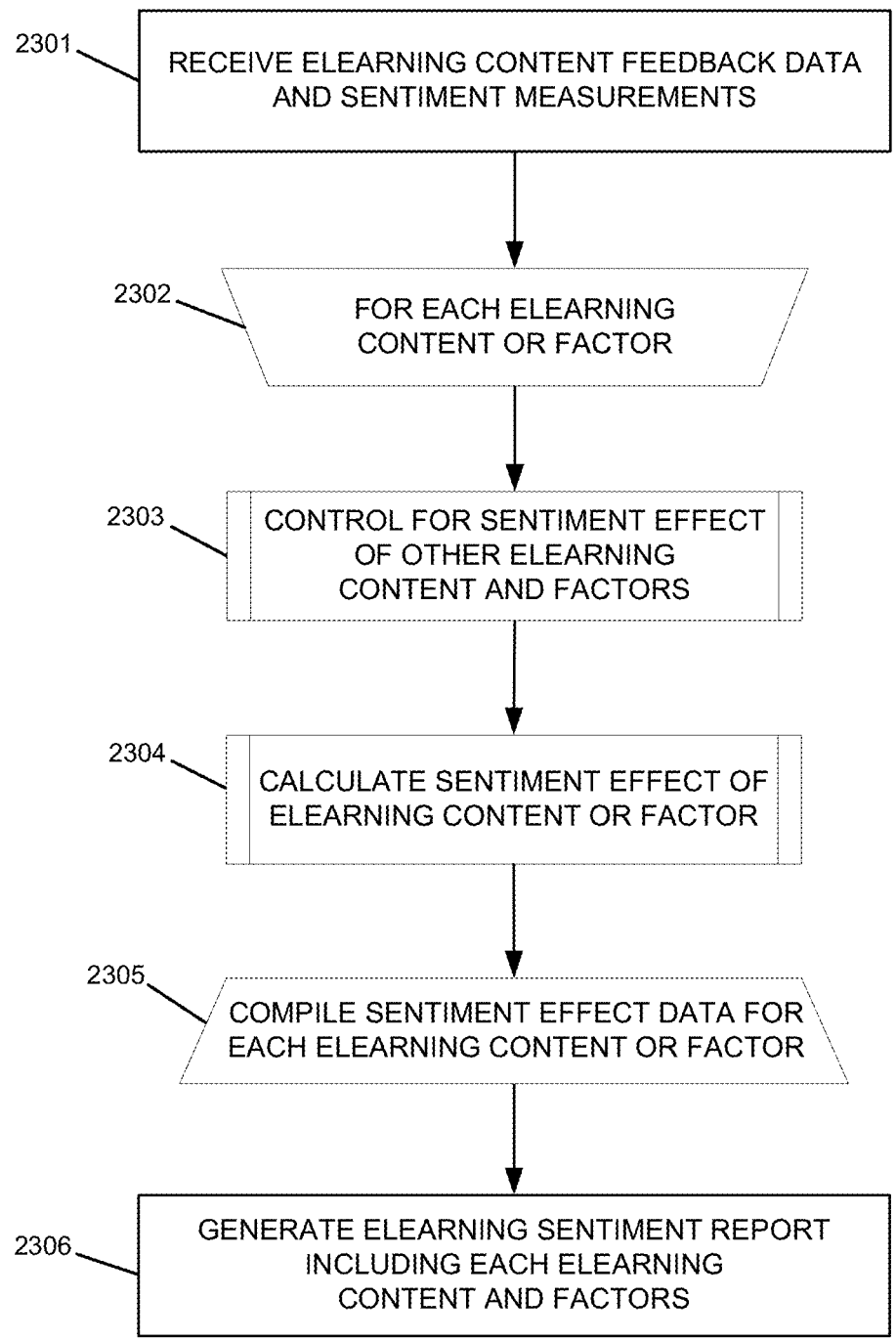
FIG. 23 is a flow diagram illustrating an example process of calculating sentiment effects associated with content or system factors, according to one or more embodiments of the disclosure.

Referring to FIGS. 23 and 24A-B, in some embodiments, the various sentiment analyzer systems and/or content distribution networks described herein may be configured to analyze sentiment associated with specific content and other system factors based on sentiment measurements captured via a CDN 100 and associated sentiment analyzer system. For example, within one or more of the sentiment analyzer systems discussed herein (e.g., systems 600, 700 1000, 1600, etc.), sets of sentiment measurements may be collected and analyzed to identify correlations between user sentiment and specific content items, as well as system factors contributing to user sentiment. In some cases, analyses of sentiment associated with specific content and other system factors may be performed in context-specific sentiment analyzer systems and CDNs, such as an eLearning sentiment analyzer system and eLearning CDN. For instance, an eLearning sentiment analyzer system 600 may calculate user-specific or group-specific efficacies for different learning materials (e.g., reading materials, eLearning projects or assignments, etc.) accessed by users via the eLearning CDN 100. eLearning sentiment analyzer systems 600 also may calculate user-specific or group-specific efficacies for eLearning system factors other than content, such as presenters/instructors, user devices, subjects, courses/modules, assignment types, and the like. Although the examples in FIGS. 23 and 24A-B relate to sentiment-based calculations in eLearning systems, similar sentiment-based determinations may be performed in other types of context-specific sentiment analyzer systems, such as interactive gaming sentiment analyzer systems, media distribution sentiment analyzer systems, eCommerce sentiment analyzer system, etc.

Sentiment analyzer systems configured to calculate content efficacy and other sentiment-based calculations may be designed and implemented with various hardware, software, and network components similarly or identical to one or more of the sentiment analyzer systems discussed above. For instance, the examples discussed in reference to FIGS. 23 and 24A-B may be performed by sentiment analyzer system 600 discussed above, including one or more content provider servers 640, user devices 630, feedback data stores 620, feedback analytics servers 610, and various other content distribution and sentiment feedback analyzer components. Such sentiment analyzer systems also may be integrated within (or configured to operate in collaboration with) a content distribution network 100, such as an eLearning CDN 100 implemented as a professional training system for company employees, an online educational system, a web-based training system, or other technology-enhanced learning system. Each component of the sentiment analyzer systems described herein may correspond to a single computer server or a complex computing system and may be implemented using any combination of the computer hardware, software, storage, and network components discussed above. For example, specialized computing devices within sentiment analyzer systems may include secure storage device(s) to store content feedback data neural network training data and/or neural networks (e.g., context-specific eLearning training data and eLearning neural networks), processors and software execution engines for analyzing content feedback and performing sentiment calculations and efficacy determinations, and network components for transmitting sentiment factor reports and other data to various output devices.

Referring now to FIG. 23, a flow diagram is shown illustrating a process of calculating sentiment effects associated with specific eLearning content or other factors in an eLearning system. The steps in this process may be performed, for example, by the components of one or more sentiment analyzer systems discussed herein (e.g., systems 600, 700 1000, 1600, etc.). However, it should be understood that the collection and analyses of feedback data, the calculations of sentiment effects associated with eLearning content and factors, and the generation and transmission of sentiment factor reports described herein need not be limited to the specific systems and hardware implementations described above, but may be performed within other computing environments comprising other combinations of the hardware and software components described herein.

In step 2301, content feedback data is received, for example, by a sentiment analytics server 610, or other device within a sentiment analyzer system 600 or other systems discussed herein. The content feedback data received in step 2301 may be associated with and/or collected by an eLearning CDN 100, and may include feedback data such as user discussion posts, online chat, or emails regarding a presentation, lecture, or course, reviews of presenters, instructors, and learning materials, and any other text-based feedback data or multimodal feedback data (e.g., voice, image, or video data) discussed above. In various examples, the eLearning content feedback data received in step 2301 may relate to a single user (e.g., employee, student, trainee, etc.) or a group of associated users enrolled in the eLearning courses/modules, viewing the same presentation, etc. The feedback data may be transmitted by user devices 630 within the eLearning CDN 100, other feedback capture devices such as cameras and microphones, and/or may be received from a feedback data store 620 or other external data store.

In some embodiments, the content feedback data received in step 2301 may include batches of multiple content feedback data items, each item including a sentiment measurement (or calculation), one or more associated users, and associated eLearning content and/or related eLearning system factors. The sentiment measurements, users, and associated factors may correspond to those discussed above, for example, in the user sentiment measurements described in step 802. For instance, each individual content feedback data may be associated with one or more users (e.g., user(s) providing the feedback, eliciting the feedback, subjects of the feedback, etc.), one or more content items in the eLearning CDN 100 (e.g., learning materials, assignments, examinations, or other eLearning content to which the feedback relates), and one or more computing devices (e.g., devices on which the content was presented to users, devices capturing the user feedback, etc.). Additionally, each individual content feedback data may have one or more sentiment values associated with the data, such as the raw sentiment scores described above step 802 and the other various examples of sentiment calculations described herein.

Steps 2302-2305 describe an iterative process for calculating sentiment effects associated with eLearning content items and/or eLearning system factors based on the content feedback data and sentiment measurements received in step 2301. For example, sentiment effects may be calculated for specific content items or types of content items (e.g., books, assignments, examinations, interactive learning software, etc.), specific users (e.g., teachers, presenters, authors, etc.), specific user devices or types of devices (e.g., mobile devices, laptops, workstations, classroom projectors, etc.), or specific subjects, courses, modules, or assignments associated with the received user feedback data. As discussed below, each of these factors may be isolated and analyzed to determine its effect on user sentiment within the eLearning system 100.

In step 2302, an individual eLearning content item or eLearning system factor may be selected for analysis. As discussed above, the eLearning content items or factors may include any data associated with one or more content feedback data items received in step 2301. In step 2303, the individual eLearning content item or system factor is isolated by controlling for the (potential) sentiment effects of all other identified eLearning content/factors, thereby allowing the sentiment effect of the isolated eLearning content or factor to be calculated in step 2304. The sentiment effect of any other eLearning content and factors may be controlled for using regression analyses on the content feedback data to effectively hold constant the other possible variables affecting sentiment.

As an example, a specific content feedback data item may represent a user's expression (e.g., via a discussion post, review, evaluation, etc.) of positive sentiment regarding a reading assignment in an eLearning course. However, to determine the specific effect the reading assignment had on the user's sentiment, it may be necessary to control for the other data factors associated with the expression of positive sentiment, such as the user's overall sentiment level, the sentiment level of the user and other users for the course, the user's performance in the course, the sentiment level of the user and other users for the instructor of the course, the time and day that the user expressed the positive sentiment, and the like. After removing the effect of these other variables via regression analysis, the effect on the user's sentiment resulting from the reading assignment may be calculated in step 2304. Similar regressions may be used to control for the reading assignment and other factors in order to calculate the effect on the user's sentiment resulting from the instructor, the course, the user's performance, the time and day of the feedback, and so on for any other associated factors.

In step 2305, the sentiment effect determinations performed in step 2303 for the eLearning content and others factors may be compiled, and in step 2306 one or more eLearning sentiment reports may be generated to describe the various eLearning content and factors. For example, referring now to FIGS. 24A and 24B, two example sentiment factor reports 2400 and 2410 are shown, each including sentiment effect data for multiple eLearning content and other eLearning system factors.

Example sentiment factor report 2400 in FIG. 24A includes positive and negative sentiment scores (e.g., from −1 to 1) which correspond to the sentiment effect of different eLearning content and factors for a single user ("Participant A") in an eLearning system. As shown in table 2400, the user's sentiment is likely to be higher for Reading Content A (+0.32) or Reading Content B (+0.46), than for Reading Content C (−0.11), and when working on a group presentation (+0.18) rather than an individual presentation (−0.49, −0.62). The user generally prefers writing assignments (+0.56, +0.51), reacts more positively to Presenter A (+0.37) than Presenter B (−0.06), and has generally higher sentiment toward the eLearning system when using Device A (+0.24) or Device B (+0.35) and lower sentiment when using Device C (−0.28). Using the data in table 2400 for the example user Participant A, the sentiment analyzer system may customize eLearning courses, assignments, and learning materials for Participant A, and make recommendations regarding course selections, instructor selections, preference times and devices for eLearning sessions, and the like.

As another example, sentiment factor report 2410 in FIG. 24B includes positive and negative sentiment scores corresponding to sentiment effects of different eLearning content and factors for a group of users in an eLearning systems (e.g., participants of a course, employees in a training program, students in a class, major, or grade level, etc.). As shown in table 2410, the group-wide sentiment indicates that the participants reacted more positively to Reading Content A (+0.23) than to Reading Content B (−0.15) or Reading Content C (−0.61). The participants prefer Presenter C (+0.59) but react positively to all presenters. The participants generally do not prefer presentation projects, but prefer group presentations (−0.22) to individual presentations (−0.45). The participants also have generally higher sentiment toward the eLearning system when using Device Type B (+0.22) rather than Device Type A (−0.33) or Device Type C (−0.04), and also prefer interacting with the eLearning system via Content/Media Type A (+0.24) rather than Content/Media Type B (−0.12). Using the data in table 2410 for the example participant group, the sentiment analyzer system may customize eLearning courses, assignments, and learning materials for the participant group and other groups within the eLearning system. The sentiment analyzer system may also use the sentiment factor data to make eLearning system-wide recommendations, perform evaluations, design curriculums, and determine preferred times and devices for users to engage in eLearning sessions.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A sentiment analyzer for an electronic learning system comprising:
one or more client devices of the electronic learning system, each client device comprising:
a processing unit comprising one or more processors;
an I/O subsystem configured to provide electronic learning content, and to receive user input data relating to the provided electronic learning content via one or more input devices connected to the client device; and
memory coupled with and readable by the processing unit and storing therein a set of instructions which, when executed by the processing unit, causes the client device to:
provide electronic learning content to one or more users via the I/O subsystem;
receive user feedback data relating to the provided electronic learning content via the I/O subsystem; and
transmit the user feedback data relating to the provided electronic learning content to a feedback analytics server of the electronic learning system; and
a feedback analytics server of the electronic learning system, comprising:
a processing unit comprising one or more processors; and memory coupled with and readable by the processing unit and storing therein a set of instructions which, when executed by the processing unit, causes the feedback analytics server of the electronic learning system to:
receive a plurality of feedback data from the one or more client devices, the received feedback data corresponding to user feedback of one or more users relating to electronic learning content;
determine an associated user and a sentiment score for each of the received plurality of feedback data;
group the plurality of feedback data into one or more feedback aggregations associated with the one or more users;
calculate a sentiment score for each of the one or more feedback aggregations associated with the one or more users using a language processing engine to determine a sentiment score for text feedback data relating to the electronic learning content;
receive user records associated with each of the one or more users, the received user records relating to interactions of the one or more users with the electronic learning system occurring after the receipt of the feedback data;
store the user records and associated sentiment scores for each of the one or more users within a data store of the electronic learning system;
training a machine learning algorithm based on the stored user records and associated sentiment scores, for each of the one or more users within the data store of the electronic learning system;
receive additional feedback data from the one or more client devices, the additional feedback data including user feedback from a first user relating to electronic learning content;
calculate a sentiment score for the first user, based on the received additional feedback data;
using the stored user records and associated sentiment scores in the data store of the electronic learning system, determine a user record prediction for the first user using the trained machine learning algorithm, based on the calculated sentiment score for the first user;
determine a sentiment analyzer output for the electronic learning system and one or more output devices, based on the determined user record prediction for the first user; and
provide the determined sentiment analyzer system-output for the electronic learning system to the determined one or more output devices.

2. The sentiment analyzer system of claim 1, wherein determining the sentiment score for each of the received plurality of feedback data comprises:
providing each of the plurality of feedback data to a natural language processing (NLP) neural network; and
receiving a plurality of sentiment scores from the NLP neural network corresponding to the received plurality of feedback data.

3. The sentiment analyzer system of claim 1, wherein the received plurality of feedback data comprises multimodal user input data relating to the electronic learning content, and wherein determining the sentiment score for the each of the received plurality of feedback data comprises at least two of:
using a language processing engine to determine a sentiment score for text feedback data relating to the electronic learning content;
using a voice analyzer to determine a sentiment score for voice feedback data relating to the electronic learning content;

using a gesture analyzer to determine a sentiment score for movement feedback data relating to the electronic learning content; and using an eye movement analyzer to determine a sentiment score for eye movement feedback data relating to the electronic learning content.

4. The sentiment analyzer system of claim 1, wherein grouping the plurality of feedback data comprises:

determining a first subset of the plurality of feedback data corresponding to feedback provided by the first user via the one or more client devices; and grouping the first subset of the plurality of feedback data into a first feedback aggregation.

5. The sentiment analyzer system of claim 1, wherein grouping the plurality of feedback data comprises:

determining a first subset of the plurality of feedback data corresponding to feedback provided by a plurality of users relating to a first set of electronic learning content; and grouping the first subset of the plurality of feedback data into a first feedback aggregation.

6. The sentiment analyzer system of claim 1, the memory of the feedback analytics server storing therein further instructions which, when executed by the processing unit, cause the feedback analytics server to:

group the plurality of feedback data into at least a first feedback aggregation and a second feedback aggregation, wherein the first and second feedback aggregations correspond to a same subset of the one or more users, and wherein the first feedback aggregation corresponds to a first feedback time period and the second feedback aggregation corresponds to a second feedback time period;

calculate a sentiment score for the second feedback aggregation; and determine a change in sentiment score for the same feedback context between the first feedback time period and the second feedback time period, by comparing the sentiment score for the second feedback aggregation to the sentiment score for the second feedback aggregation, wherein the sentiment analyzer system output is determined based on the change in sentiment score.

7. The sentiment analyzer system of claim 1, wherein the received plurality of feedback is related to a presentation of live electronic learning content within the electronic learning system, and wherein determining and providing the sentiment analyzer system output to the one or more output devices comprises:

determining one or more computing devices associated with a presenter of the live electronic learning content;

determining the sentiment analyzer system output for the presenter of the live electronic learning content, based on the sentiment score for a first feedback aggregation; and transmitting the sentiment analyzer system output to the computing devices associated with the presenter of the live electronic learning content during the presentation of the live electronic learning content.

8. The sentiment analyzer system of claim 1, further comprising a data store server comprising one or more data stores, wherein receiving the plurality of feedback data from the one or more client devices comprises:

receiving the plurality of feedback data via an event streaming service executing on the data store server.

9. The sentiment analyzer system of claim 1, wherein calculating the sentiment score for each of the one or more feedback aggregations associated with the one or more users comprises:

calculating a Z-score for the a feedback aggregation associated with a first user, based on the sentiment scores for each of the feedback data within the first feedback aggregation; and calculating a stanine score for the first feedback aggregation based on the Z-score for the first feedback aggregation.

10. A method of analyzing feedback data of an electronic learning system comprising:

receiving a plurality of feedback data from one or more client devices, the received feedback data corresponding to user feedback of one or more users relating to electronic learning content of the electronic learning system;

determining an associated user and a sentiment score for each of the received plurality of feedback data;

grouping the plurality of feedback data into one or more feedback aggregations associated with the one or more users;

calculating a sentiment score for each of the one or more first feedback aggregations associated with the one or more users;

receiving user records associated with each of the one or more users, the received user records relating to interactions of the one or more users with the electronic learning system occurring after receipt of the feedback data;

storing the user records and associated sentiment scores for each of the one or more user within a data store of the electronic learning system;

training a machine learning algorithm based on the stored user records and associated sentiment scores, for each of the one or more users within the data store of the electronic learning system;

receiving additional feedback data from the one or more client devices, the additional feedback data including user feedback from a first user relating to electronic learning content;

calculating a sentiment score for the first user, based on the received additional feedback data;

using the stored user records and associated sentiment scores in the data store of the electronic learning system, determining a user record prediction for the first user using the trained machine learning algorithm, based on the calculated sentiment score for the first user;

determining an output and one or more output devices, based on the determined user record prediction for the first user; and transmitting the determined output to the determined one or more output devices.

11. The method of claim 10, wherein determining the sentiment score for each of the received plurality of feedback data comprises:

providing each of the plurality of feedback data to a natural language processing (NLP) neural network; and receiving a plurality of sentiment scores from the NLP neural network corresponding to the received plurality of feedback data.

12. The method of claim 10, wherein the received plurality of feedback data comprises multimodal user input data relating to the electronic learning content, and wherein determining the sentiment score for the each of the received plurality of feedback data comprises at least two of:

using a language processing engine to determine a sentiment score for text feedback data relating to the electronic learning content;
using a voice analyzer to determine a sentiment score for voice feedback data relating to the electronic learning content;
using a gesture analyzer to determine a sentiment score for movement feedback data relating to the electronic learning content; and
using an eye movement analyzer to determine a sentiment score for eye movement feedback data relating to the electronic learning content.

13. The method of claim 10, wherein the received plurality of feedback is related to a presentation of live electronic learning content within the electronic learning system, and wherein determining and providing the output to the one or more output devices comprises:
determining one or more computing devices associated with a presenter of the live electronic learning content;
determining the output for the presenter of the live electronic learning content, based on the sentiment score for the a feedback aggregation; and
transmitting the output to the computing devices associated with the presenter of the live electronic learning content during the presentation of live electronic learning content.

14. The method of claim 10, wherein receiving the plurality of feedback data from the one or more client devices comprises:
receiving the plurality of feedback data via an event streaming service executing on a data store server separate from the one or more client devices.

15. The method of claim 10, wherein calculating the sentiment score for each of the one or more feedback aggregations associated with the one or more users comprises:
calculating a Z-score for a first feedback aggregation associated with a first user, based on the sentiment scores for each of the feedback data within the first feedback aggregation; and
calculating a stanine score for the first feedback aggregation based on the Z-score for the first feedback aggregation.

16. A computer-program product tangibly embodied in a non-transitory machine-readable storage medium, including instructions configured to cause one or more data processors to perform actions including:
receiving a plurality of feedback data from one or more client devices, the received feedback data corresponding to user feedback of one or more users relating to electronic learning content presented via an electronic learning system;
determining an associated user a feedback context and a sentiment score for each of the received plurality of feedback data;
grouping the plurality of feedback data into one or more feedback aggregations associated with the one or more users;
calculating a sentiment score for each of the one or more feedback aggregation associated with the one or more users;
receiving user records associated with each of the one or more users, the received user records relating to interactions of the one or more users with the electronic learning system occurring after the receipt of the feedback data;
storing the user records and associated sentiment scores for each of the one or more users within a data store of the electronic learning system;
training a machine learning algorithm based on the stored user records and associated sentiment scores, for each of the one or more users within the data store of the electronic learning system;
receiving additional feedback data from the one or more client devices, the additional feedback data including user feedback from a first user relating to electronic learning content;
calculating a sentiment score for the first user, based on the received additional feedback data;
using the stored user records and associated sentiment scores in the data store of the electronic learning system, determining a user record prediction for the first user using the trained machine learning algorithm, based on the calculated sentiment score for the first user;
determining an output and one or more output devices, based on the determined user record prediction for the first user; and
transmitting the determined output to the determined one or more output devices.

17. The computer-program product as recited in claim 16, wherein
determining the sentiment score for each of the received plurality of feedback data comprises:
providing each of the plurality of feedback data to a natural language processing (NLP) neural network; and
receiving a plurality of sentiment scores from the NLP neural network corresponding to the received plurality of feedback data.

18. The computer-program product as recited in claim 16, wherein the received plurality of feedback data comprises multimodal user input data relating to the electronic learning content, and wherein determining the sentiment score for the each of the received plurality of feedback data comprises at least two of:
using a language processing engine to determine a sentiment score for text feedback data relating to the electronic learning content;
using a voice analyzer to determine a sentiment score for voice feedback data relating to the electronic learning content;
using a gesture analyzer to determine a sentiment score for movement feedback data relating to the electronic learning content; and
using an eye movement analyzer to determine a sentiment score for eye movement feedback data relating to the electronic learning content.

19. The computer-program product as recited in claim 16, wherein receiving the plurality of feedback data from the one or more client devices comprises:
receiving the plurality of feedback data via an event streaming service executing on a data store server separate from the one or more client devices.

20. The computer-program product as recited in claim 16, wherein calculating the sentiment score for each of the one or more feedback aggregations associated with the one or more users comprises:
calculating a Z-score for a first feedback aggregation associated with a first user, based on the sentiment scores for each of the feedback data within the first feedback aggregation; and calculating a stanine score for the first feedback aggregation based on the Z-score for the first feedback aggregation.

\* \* \* \* \*